(12) United States Patent
Yadav et al.

(10) Patent No.: US 12,615,257 B2
(45) Date of Patent: Apr. 28, 2026

(54) METHODS AND SYSTEMS FOR PROVIDING NETWORK CONNECTIVITY TO A SECURE ACCESS SERVICE EDGE (SASE) DOMAIN VIA AN ISP

(71) Applicant: Versa Networks, Inc., Santa Clara, CA (US)

(72) Inventors: Chitresh Yadav, Frisco, TX (US); Rahul Vaidya, Sunnyvale, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 18/592,170

(22) Filed: Feb. 29, 2024

(65) Prior Publication Data

US 2025/0280001 A1 Sep. 4, 2025

(51) Int. Cl.
*H04L 9/40* (2022.01)
(52) U.S. Cl.
CPC .................................... *H04L 63/10* (2013.01)
(58) Field of Classification Search
CPC ...................................................... H04L 63/10
See application file for complete search history.

(56) References Cited

U.S. PATENT DOCUMENTS

| | | | |
|---|---|---|---|
| 11,375,005 B1 | 6/2022 | Rolando et al. | |
| 12,245,036 B1 | 3/2025 | Banerjee et al. | |
| 2007/0123238 A1 | 5/2007 | Jagadeesan et al. | |

| | | | | |
|---|---|---|---|---|
| 2009/0161677 A1 | 6/2009 | Zheng | | |
| 2016/0315808 A1* | 10/2016 | Saavedra | .............. | H04L 47/825 |
| 2018/0184340 A1 | 6/2018 | Pularikkal et al. | | |
| 2018/0367574 A1 | 12/2018 | Verma et al. | | |
| 2021/0067560 A1 | 3/2021 | Verma et al. | | |
| 2021/0112401 A1 | 4/2021 | Chadwick et al. | | |
| 2021/0152567 A1* | 5/2021 | Huston, III | .......... | H04L 63/205 |
| 2021/0306854 A1* | 9/2021 | Gundavelli | ............. | H04W 8/24 |
| 2021/0336934 A1 | 10/2021 | Deshmukh et al. | | |
| 2022/0078209 A1 | 3/2022 | V et al. | | |
| 2022/0103597 A1 | 3/2022 | Gobena et al. | | |
| 2022/0200869 A1 | 6/2022 | Erlingsson et al. | | |
| 2022/0215101 A1 | 7/2022 | Rioux et al. | | |
| 2022/0231881 A1 | 7/2022 | Chan et al. | | |
| 2022/0286860 A1 | 9/2022 | Howe et al. | | |
| 2022/0321534 A1 | 10/2022 | Jeuk et al. | | |

(Continued)

OTHER PUBLICATIONS

Yiliyaer et al. (Secure Access Service Edge: A Zero Trust Based Framework For Accessing Data Securely, IEEE, 2022, 6 pages) (Year: 2022).*

(Continued)

*Primary Examiner* — Oleg Korsak
(74) *Attorney, Agent, or Firm* — LOZA & LOZA, LLP

(57) ABSTRACT

Methods and system for providing network connectivity are disclosed. In an example, a method for providing network connectivity involves receiving from an Internet Service Provider (ISP) an access ID and an IP address at a SASE domain, wherein the access ID and the IP address correspond to a subscriber of the ISP, generating an IP address-to-tenant mapping at the SASE domain by applying the access ID and the IP address to an access ID-to-tenant mapping, and forwarding traffic received at the SASE domain from a Broadband Network Gateway (BNG) of the ISP according to the IP address-to-tenant mapping.

18 Claims, 18 Drawing Sheets

(56)        References Cited

U.S. PATENT DOCUMENTS

| | | | |
|---|---|---|---|
| 2022/0353244 | A1 | 11/2022 | Kahn et al. |
| 2023/0036547 | A1 | 2/2023 | Hanes et al. |
| 2023/0269252 | A1 | 8/2023 | Bakke |
| 2023/0403282 | A1 | 12/2023 | Smith et al. |
| 2024/0073974 | A1 | 2/2024 | Srinivas et al. |
| 2024/0129321 | A1* | 4/2024 | Howe ..................... H04L 63/20 |
| 2024/0283826 | A1* | 8/2024 | Ganguli ............. H04L 63/0281 |
| 2024/0314192 | A1 | 9/2024 | Parla |
| 2024/0333626 | A1 | 10/2024 | Thakore et al. |
| 2025/0030737 | A1 | 1/2025 | Tangirala et al. |
| 2025/0039138 | A1 | 1/2025 | Jain et al. |
| 2025/0055873 | A1 | 2/2025 | Hurry |
| 2025/0142340 | A1* | 5/2025 | Verma ................... H04W 12/45 |
| 2025/0202926 | A1* | 6/2025 | Chandrabose ...... H04L 63/1433 |

OTHER PUBLICATIONS

MEF Standard (MEF 117, SASE Service Attributes and Service Framework, Oct. 2022, 65 pages (Year: 2022).*

Digi International, "Digi Connect® Application GuidE Cellular IP Connections (Uncovered)", Jul. 18, 2005, 7 pgs.

Mehta, Kumar et al. "SASE for Dummies", Versa Networks Special Edition, 2021, 79 pgs.

Office Action in co-pending U.S. Appl. No. 18/592,205, dated Jul. 28, 2025, 10 pages.

Notice of Allowance on co-pending U.S. Appl. No. 18/592,205 dated Jan. 28, 2026.

* cited by examiner

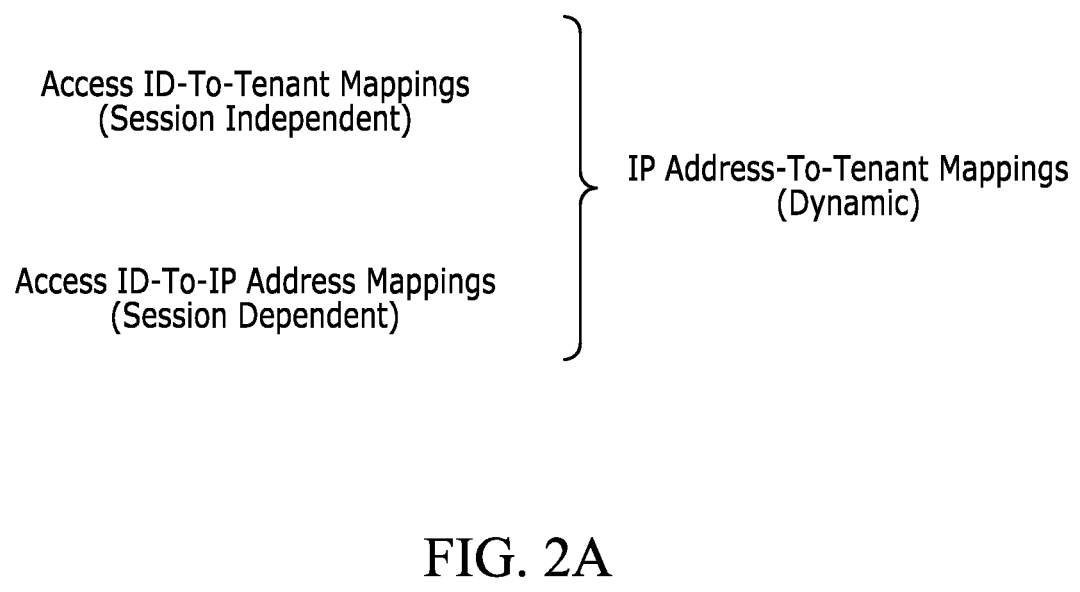

Access ID-To-Tenant Mappings
(Session Independent)

IP Address-To-Tenant Mappings
(Dynamic)

Access ID-To-IP Address Mappings
(Session Dependent)

FIG. 2A

Established By SASE Provider

| Access ID | Tenant |
|---|---|
| XXXXXXXXXXX | Tenant 1 |
| XXXXXXXXXXX | Tenant 1 |
| ⋮ | ⋮ |
| XXXXXXXXXXX | Tenant 1 |
| XXXXXXXXXXX | Tenant 2 |
| XXXXXXXXXXX | Tenant 2 |
| XXXXXXXXXXX | Tenant 3 |

202

Provided By ISP Only Upon Authentication/Authorization

| Access ID | IP Address |
|---|---|
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |

204

Generated By SASE Provider,
Distributed To SASE Gateways

| IP Address | Tenant |
|---|---|
| aaa.bbb.ccc.ddd | Tenant 1 |
| aaa.bbb.ccc.ddd | Tenant 1 |
| ⋮ | ⋮ |
| aaa.bbb.ccc.ddd | Tenant 1 |
| aaa.bbb.ccc.ddd | Tenant 2 |
| aaa.bbb.ccc.ddd | Tenant 2 |
| aaa.bbb.ccc.ddd | Tenant 3 |
| aaa.bbb.ccc.ddd | Tenant 3 |
| aaa.bbb.ccc.ddd | Tenant 4 |

Established By SASE Provider　302

| ISP Access ID | Tenant | Tenant-Specific Group ID |
|---|---|---|
| XXXXXXXXXXX | Tenant 1 | Group A |
| XXXXXXXXXXX | Tenant 1 | Group B |
| ⋮ | ⋮ | ⋮ |
| XXXXXXXXXXX | Tenant 1 | Group C |
| XXXXXXXXXXX | Tenant 2 | Group E |
| XXXXXXXXXXX | Tenant 2 | Group F |
| XXXXXXXXXXX | Tenant 3 | Group G |

| Tenant-1 Group ID | SASE Policy |
|---|---|
| Group A | Policy-111 |
| Group B | Policy-121 |
| Group C | Policy-122 |
| | |
| | |
| | |
| | |

+

Provided By ISP Only Upon Authentication/Authorization　304

| ISP Access ID | IP Address |
|---|---|
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |
| XXXXXXXXXXX | aaa.bbb.ccc.ddd |

| Tenant-2 Group ID | SASE Policy |
|---|---|
| Group A | Policy-211 |
| Group E | Policy-221 |
| Group F | Policy-222 |
| | |
| | |

Generated By SASE Provider, Distributed To SASE Gateways　306

| IP Address | Tenant | Tenant-Specific Group ID |
|---|---|---|
| aaa.bbb.ccc.ddd | Tenant 1 | Group A |
| aaa.bbb.ccc.ddd | Tenant 1 | Group B |
| aaa.bbb.ccc.ddd | ⋮ | ⋮ |
| aaa.bbb.ccc.ddd | Tenant 1 | Group C |
| aaa.bbb.ccc.ddd | Tenant 2 | Group E |
| aaa.bbb.ccc.ddd | Tenant 2 | Group F |
| aaa.bbb.ccc.ddd | Tenant 3 | Group G |
| aaa.bbb.ccc.ddd | Tenant 3 | |

| Tenant-1 Group ID | SASE Policy |
|---|---|
| Group A | Policy-111 |
| Group B | Policy-121 |
| Group C | Policy-122 |

| Tenant-2 Group ID | SASE Policy |
|---|---|
| Group D | Policy-211 |
| Group E | Policy-221 |
| Group F | Policy-222 |

FIG. 3D

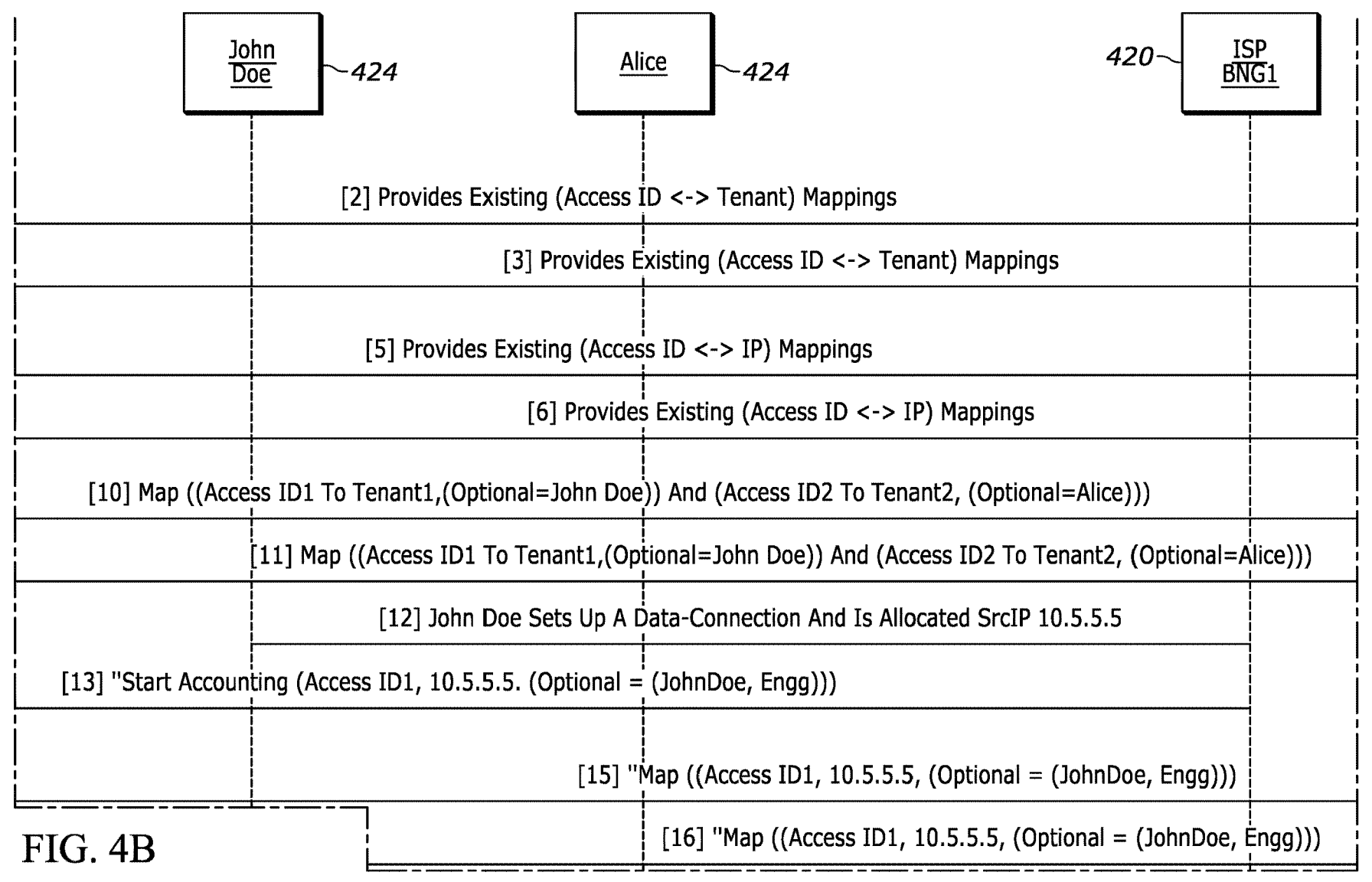

ISP
BNG1

420

Alice

424

John
Doe

424

[2] Provides Existing (Access ID <-> Tenant) Mappings

[3] Provides Existing (Access ID <-> Tenant) Mappings

[5] Provides Existing (Access ID <-> IP) Mappings

[6] Provides Existing (Access ID <-> IP) Mappings

[10] Map ((Access ID1 To Tenant1,(Optional=John Doe)) And (Access ID2 To Tenant2, (Optional=Alice)))

[11] Map ((Access ID1 To Tenant1,(Optional=John Doe)) And (Access ID2 To Tenant2, (Optional=Alice)))

[12] John Doe Sets Up A Data-Connection And Is Allocated SrcIP 10.5.5.5

[13] "Start Accounting (Access ID1, 10.5.5.5. (Optional = (JohnDoe, Engg)))

[15] "Map ((Access ID1, 10.5.5.5, (Optional = (JohnDoe, Engg)))

[16] "Map ((Access ID1, 10.5.5.5, (Optional = (JohnDoe, Engg)))

FIG. 4B

Access ID-To-Tier (E.g., Gold/ Silver/ Bronze)

Access ID-To-IP Address Mapping

} IP Address-To-Tier Mapping (Dynamic)

502
ISP Domain

504
SASE Domain

514
ISP Provisioning System

Access-ID To Tier (E.g., Gold/ Silver/ Bronze)

530
SASE Controller

Access ID To IP Mapping

IP Address ->Tier-> Policies

BNG
520

547

549
SASE GW
532

IP Pool-To-Tier (E.g., Gold/ Silver/ Bronze) } IP Address-To-Tier Mapping (Static)

Established By ISP

| IP Address Pool | Tier |
|---|---|
| IP Address Pool A | Tier 1 |
| IP Address Pool B | Tier 2 |
| IP Address Pool C | Tier 3 |

602〜

Provided To
SASE Domain

| IP Address | Tier |
|---|---|
| aaa.bbb.ccc.ddd | Tier 1 |
| ⋮ | ⋮ |
| aaa.bbb.ccc.ddd | Tier 1 |
| aaa.bbb.ccc.ddd | Tier 2 |
| ⋮ | ⋮ |
| aaa.bbb.ccc.ddd | Tier 2 |
| aaa.bbb.ccc.ddd | Tier 3 |
| ⋮ | ⋮ |
| aaa.bbb.ccc.ddd | Tier 3 |

606〜

METHODS AND SYSTEMS FOR PROVIDING NETWORK CONNECTIVITY TO A SECURE ACCESS SERVICE EDGE (SASE) DOMAIN VIA AN ISP

BACKGROUND

Secure Access Service Edge (SASE) is a cloud native technology that establishes network security as an integrated, embedded function of an enterprise network. SASE combines SD-WAN networking and embedded security capabilities in a cloud-native manner that shifts security focus from traffic flow-centric to identity-centric. Although SASE technology provides many benefits, SASE implementations typically rely on software clients installed on devices to enable remote access to an enterprise network. While software clients enable authentication to a SASE, the demands for access and an explosion in connected devices can make client-based access control inefficient and/or impractical.

SUMMARY

Methods and system for providing network connectivity are disclosed. In an example, a method for providing network connectivity involves receiving from an Internet Service Provider (ISP) an access ID and an IP address at a SASE domain, wherein the access ID and the IP address correspond to a subscriber of the ISP, generating an IP address-to-tenant mapping at the SASE domain by applying the access ID and the IP address to an access ID-to-tenant mapping, and forwarding traffic received at the SASE domain from a Broadband Network Gateway (BNG) of the ISP according to the IP address-to-tenant mapping.

In an example, the access ID and the IP address are received at the SASE domain only after access to the ISP is granted using the access ID.

In an example, granting access to the ISP using the access ID involves implementing a Point-to-Point Protocol over Ethernet (PPPoE) connection to the ISP.

In an example, granting access to the ISP using the access ID involves implementing a Data Over Cable Service Interface Specification (DOCSIS) connection to the ISP.

In an example, the access ID is provided to a subscriber by the ISP.

In an example, the access ID is required to gain access to the ISP.

In an example, the traffic received at the SASE domain is generated from a device that is authorized by the ISP using the access ID before the access ID and the IP address are sent to the SASE domain.

In an example, the access ID is provided to a subscriber by the ISP, and wherein the traffic received at the SASE domain is transmitted from a device that is granted access to the ISP using the access ID before the access ID and the IP address is sent to the SASE domain.

In an example, a tenant of the access ID-to-tenant mapping and of the IP address-to-tenant mapping corresponds to company that subscribes to a service provided by the SASE domain.

In an example, a tenant of the access ID-to-tenant mapping and of the IP address-to-tenant mapping corresponds to a tier of service provided by the SASE domain.

In an example, the IP address-to-tenant mapping includes multiple tenants that correspond to multiple tiers of service, and wherein the tiers of service include a first tier of service and a second tier of service, where the first tier of service provides a different level of service than the second tier of service.

A non-transitory computer readable medium that stores computer readable instructions, which when executed on one or more processors, implements a method for providing network connectivity is also disclosed. The method involves receiving from an ISP an access ID and an IP address at a SASE domain, wherein the access ID and the IP address correspond to a subscriber of the ISP, generating an IP address-to-tenant mapping at the SASE domain by applying the access ID and the IP address to an access ID-to-tenant mapping, and forwarding traffic received at the SASE domain from a Broadband Network Gateway (BNG) of the ISP according to the IP address-to-tenant mapping.

In an example, the access ID and the IP address are received at the SASE domain only after access to the ISP is granted using the access ID.

In an example, granting access to the ISP using the access ID involves implementing a PPPoE connection to the ISP.

In an example, granting access to the ISP using the access ID involves implementing a DOCSIS connection to the ISP.

In an example, the access ID is required to gain access to the ISP.

Another example of a method for providing network connectivity is disclosed. The method involves receiving from an ISP an access ID and an IP address at a SASE controller, wherein the access ID and the IP address correspond to a subscriber of the ISP, generating an IP address-to-tenant mapping at the SASE controller by applying the access ID and the IP address to an access ID-to-tenant mapping, distributing the IP address-to-tenant mapping from the SASE controller to a SASE gateway, and forwarding traffic received at the SASE gateway from a device via the ISP according to the IP address-to-tenant mapping.

In an example, the access ID and the IP address are received at the SASE domain only after access to the ISP is granted using the access ID.

In an example, granting access to the ISP using the access ID involves implementing a PPPoE connection to the ISP.

In an example, granting access to the ISP using the access ID involves implementing a DOCSIS connection to the ISP.

Other aspects and advantages of examples of the present invention will become apparent from the following detailed description taken in conjunction with the accompanying drawings.

BRIEF DESCRIPTION OF THE DRAWINGS

FIG. 2A is a high-level representation of functionality implemented within a SASE domain to ensure that devices in the ISP domain are authorized to access a tenant-specific network.

FIG. 2B illustrates the generation of IP address-to-tenant mappings using access ID-to-tenant mappings and access ID-to-IP address mappings.

FIG. 3D depicts access ID-to-tenant and IP address-to-tenant mappings that are extended to support tenant-specific groups.

FIGS. 4A-4F are a process flow diagram of a technique for secure connectivity that relies on ISP authentication as a proxy of trust.

Throughout the description, similar reference numbers may be used to identify similar elements.

DETAILED DESCRIPTION

Figure 1A:
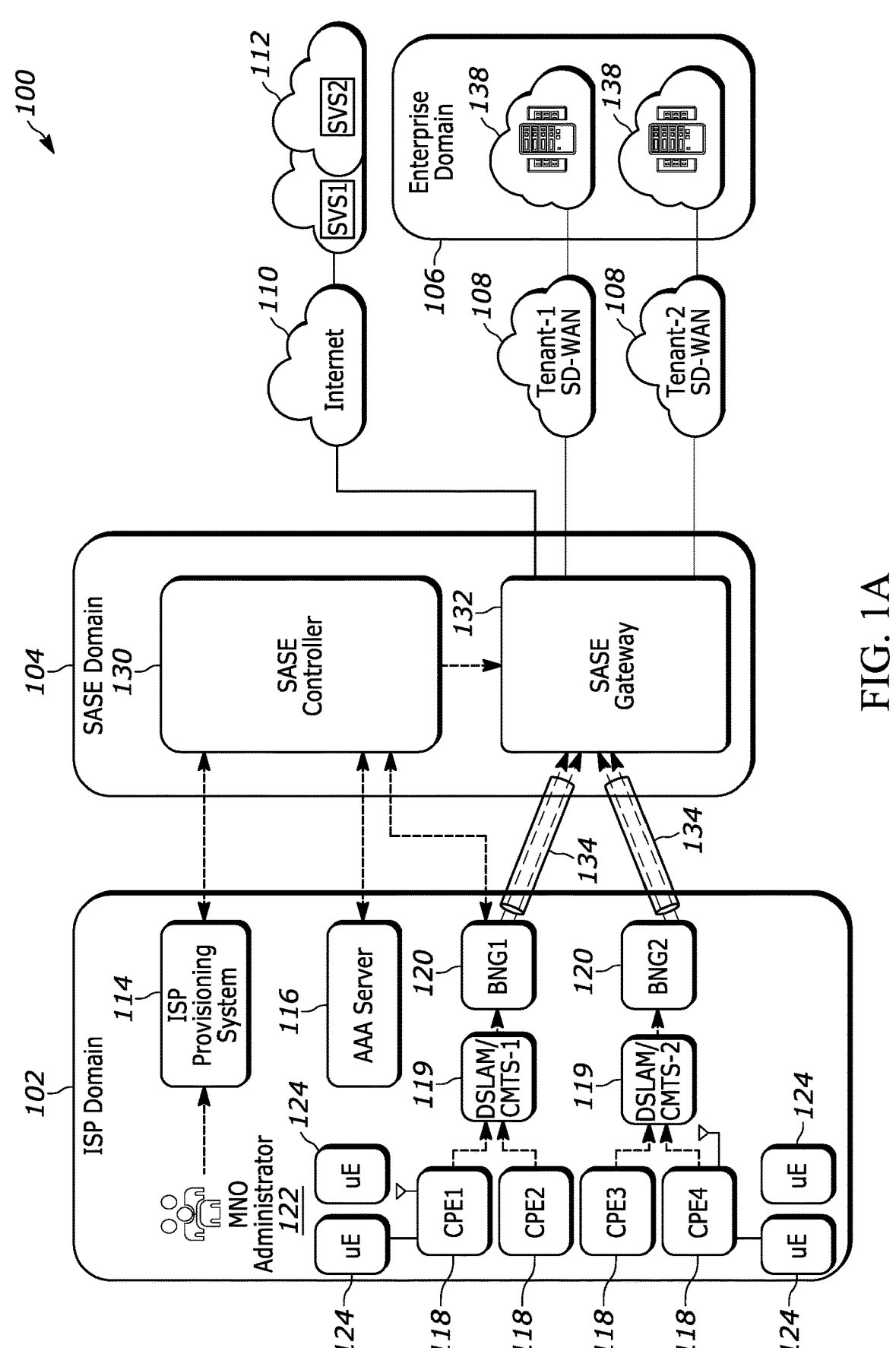
FIG. 1A depicts an example network architecture in which authentication by an ISP is used as a proxy of trust for gaining access to a SASE and ultimately gaining access to other cloud-based resources.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

The present invention may be embodied in other specific forms without departing from its spirit or essential characteristics. The described examples are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single example of the invention. Rather, language referring to the features and advantages is understood to mean that a specific feature, advantage, or characteristic described in connection with an example is included in at least one example of the present invention. Thus, discussions of the features and advantages, and similar language, throughout this specification may, but do not necessarily, refer to the same example.

Furthermore, the described features, advantages, and characteristics of the invention may be combined in any suitable manner in one or more examples. One skilled in the relevant art will recognize, in light of the description herein, that the invention can be practiced without one or more of the specific features or advantages of a particular example. In other instances, additional features and advantages may be recognized in certain examples that may not be present in all examples of the invention.

Reference throughout this specification to "one example," "an example," or similar language means that a particular feature, structure, or characteristic described in connection with the indicated example is included in at least one example of the present invention. Thus, the phrases "in one example," "in an example," and similar language throughout this specification may, but do not necessarily, all refer to the same example.

SASE combines SD-WAN networking technology and embedded security capabilities in a cloud native manner that shifts security focus from traffic flow-centric to identity-centric. Conventional network architectures were designed with specific network policy enforcement points and force routed traffic through the enforcement points to implement security checks. Such enforcement points are often not along the most expedient path and can lead to traffic bottlenecks. SASE takes a different approach in which security enforcement is implemented where the traffic flow is (e.g., at client and application endpoints) as well as at strategically placed gateways and proxies along previously established and efficient paths. SASE enables ubiquitous and direct client to cloud security that is integrated with client to cloud WAN technology to realize a flexible and scalable network architecture that offers embedded security along a software defined perimeter (SDP). A description of SASE can be found in *SASE for Dummies®, Versa Network Special Edition*, John Wiley & Sons, Inc., 2021. In a typical SASE, components including Secure SD-WAN, Secure Web Gateway (SWG), Cloud Access Security Broker (CASB), Zero Trust Network Access (ZTNA), firewalling, Next Generation Firewall (NGFW) and Firewall-as-a-Service (FWaaS) are involved in defining and protecting the SDP. These components of the SASE are engaged in a connection when needed, such as the NGFW, SWG, or CASB, or are fundamental capabilities integral to the fabric of SASE such as SD-WAN and ZTNA. The components of the SASE along with SASE clients installed on user devices work together to ensure that only trusted devices can access secure network resources.

Internet Service Providers (ISPs) provide data connections for a wide range of devices including WiFi enabled devices and wired devices (e.g., devices connected by Ethernet cables). With the development of more broadband access technologies, it is expected that ISPs will also provide network connectivity to a wide variety of both companies and individual subscribers. As described above, a fundamental aspect of SASE technology is providing network access to only trusted devices. When a device is not equipped with a SASE client, determining whether or not a device is trusted can be difficult. It has been realized that techniques implemented by ISPs to grant access to their networks can be used as a proxy of trust for controlling access to network resources that are secured by a SASE. For example, in some ISP networks, a Point-to-Point Protocol over Ethernet (PPPoE) connection between a device, e.g., a Customer Premise Equipment (CPE), and a Broadband Network Gateway (BNG) of the ISP can be relied upon as a proxy of trust to allow a client-less device (e.g., a device that is not equipped with a SASE client) to access an enterprise network via the ISP and a SASE, while in other ISP networks, a Data Over Cable Service Interface Specification (DOCSIS) based connection between a device, e.g., a cable modem, and a Cable Modem Termination System (CMTS) of the ISP can be relied upon as a proxy of trust to allow a client-less device (e.g., a device that is not equipped with a SASE client) to access an enterprise network via the ISP and a SASE. In accordance with an example of the invention, a technique for providing network connectivity involves receiving from an ISP an access ID and an IP address at a SASE domain, wherein the access ID and the IP address correspond to a subscriber of the ISP, generating an IP address-to-tenant mapping at the SASE domain by applying the access ID and the IP address to an access ID-to-tenant mapping, and forwarding traffic received at the SASE domain from a BNG of the ISP according to the IP address-to-tenant mapping. Thus, the procedure implemented by the ISP to grant access to the ISP creates a trusted relationship between the ISP and the device (e.g., a CPE) and the trusted relationship between the ISP and the device is leveraged by the SASE domain as a proxy of trust with respect to the device to provide SASE related services.

Figure 1B:
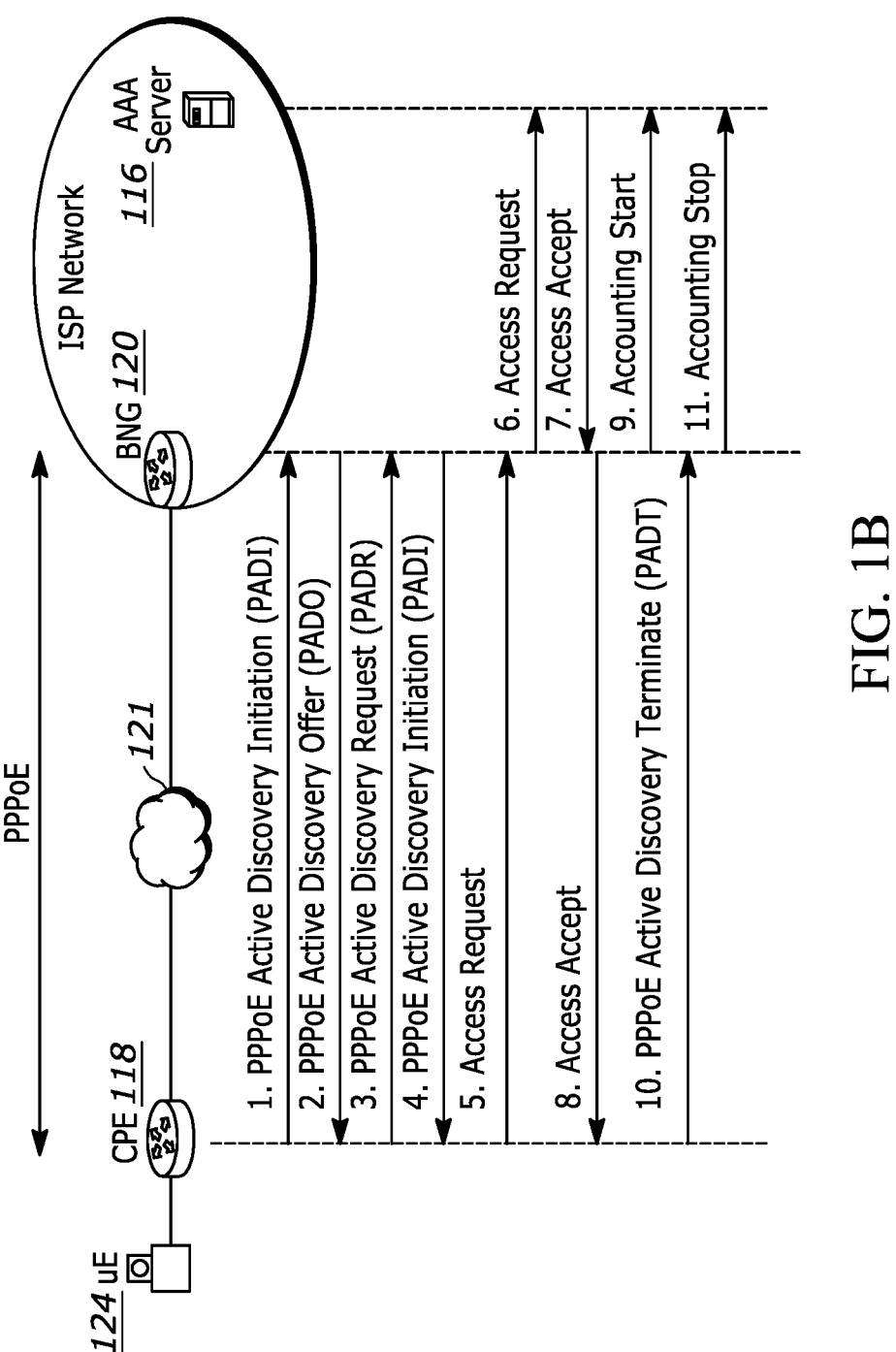
FIG. 1B illustrates an example of a process that is used by an ISP to authenticate and/or authorize a device that tries to gain access to the ISP.

FIGS. 1A and 1B depict an example network architecture 100 in which a connection operation implemented by an ISP is used as a proxy of trust for gaining access to a SASE domain and ultimately gaining access to other cloud-based resources, including, for example, an enterprise network. The network architecture depicted in FIG. 1A includes an ISP domain 102, a SASE domain 104, and an enterprise domain 106. The network architecture also depicts tenant specific SD-WANs 108, the Internet 110, and various cloud services 112 (SVS1 and SVS2), e.g., video streaming services, communications services, office productivity services, storage services, and enterprise services. In one example use case, a company desires to utilize an ISP service provided by the ISP domain and a SASE service provided by the SASE domain. For example, accompany may want to have both ISP and SASE service for ten branch offices and two executives. Examples of how such service can be provided to client-less devices (e.g., devices that do not use a SASE client) are described herein.

With reference to FIG. 1A, the ISP domain 102 includes an ISP provisioning system 114, an Authentication, Authorization, and Accounting (AAA) server 116 (e.g., a RADIUS server), CPEs 118 (e.g., CPE1, CPE2, CPE3, CPE4), access devices (e.g., digital subscriber line access multiplexer (DSLAM)/cable modem termination system (CMTS), DSLAM/CMTS-1 and DSLAM/CMTS-2), and BNGs 120. The ISP domain may also include a core network that connects between the access equipment and/or the BNGs, although the core network is not shown in FIG. 1A. The ISP provisioning system 114 is configured to establish access rights and privileges for subscribers and/or corresponding devices (e.g., CPEs) in the ISP domain and can be managed by an ISP administrator 122. The AAA server 116 manages authentication, authorization, and accounting functions of the ISP, and may sometimes be referred to as a RADIUS server. The BNGs provide access to packet-based data networks including private networks such as the SD-WANs 108 and public networks such as the Internet 110. In an example, a BNG is configured to enable subscribers to connect to a broadband network such as the Internet. For example, the BNG manages subscribers and aggregates traffic from various subscriber sessions in an access network and routes the traffic to a service provider network. A BNG may manage and deliver various broadband subscriber services, including Authentication, Authorization, and Accounting (AAA) of broadband subscribers, establishing subscriber sessions and aggregation of subscriber traffic, and applying quality of service and policy functions on subscriber sessions. The BNGs may include, for example, distributed and/or centralized components, e.g., a distributed BNG or a centralized BNG.

The access devices 119 may include equipment that enables network connections between the BNGs 120 and the CPEs 118. In a DSL access network, the access devices may include DSL Access Multiplexers (DSLAMs) and in a cable access network, the access devices may include Cable Modem Termination Systems (CMTSs) as is known in the field. In other examples, the access devices 119 may be other types of network devices.

The CPEs 118 may include DSL modems and/or cable models depending on the type of access network as is known in the field. In an example, the CMTSs and cable modem are configured to operate according to a Data Over Cable Service Interface Specification (DOCSIS) as is known in the field. The CPE may also include devices that support other network technologies, including, for example, optical line termination (OLT), fiber-to-the-home (FTTH), fiber-to-the-curb (FTTC). In an example, the CPEs are "client-less" with regard to the SASE domain 104 because the CPEs do not have a SASE client locally installed.

The devices 124 are configured to connect to the CPEs 118 and are often referred to as User Equipment 124 or simply "UE" and such devices may be wired (e.g., connected to the CPE an by Ethernet cable) or wireless (e.g., connected to the CPE by WiFi). The devices (e.g., UEs) may include, for example, mobile phones, smartphones, tablets, laptop computers, desktop computers, and wearable devices (e.g., smartwatches). The devices may also include IoT devices. In an example, the devices 124 (e.g., UEs) are "client-less" with regard to the SASE domain 104 because the devices 124 do not have a SASE client locally installed. In another example, even if a device 124 has a SASE client locally installed, the application of SASE services can be controlled by the SASE domain using the client-less technique that is described herein without the user having to utilize the SASE client on the device.

The SASE domain 104 includes a SASE controller 130 and a SASE Gateway 132. The SASE controller implements control plane functionality within the SASE domain. For example, the SASE controller implements user/device registration operations and manages the generation and distribution of rules for routing traffic through the SASE domain. The SASE gateway implements data plane functionality within the SASE domain. For example, the SASE gateway implements access control and traffic forwarding within the SASE domain. In addition, although only one SASE gateway is shown in FIG. 1, the SASE domain may include multiple SASE gateways distributed throughout the SASE domain. The SASE controller and SASE gateway work in combination to implement SASE functionality, including, for example, Secure Web Gateway (SWG), Denial of Service (DOS), Cloud Access Service Broker (CASB), Data Leak Prevention (DLP), Carrier Grade Network Address Translation (CGNAT), and Zero Trust Network Access (ZTNA). In an example, the SASE controller and SASE gateway are functional entities executed through computer-readable instructions, which functionality can be executed on the same hardware components or distributed amongst hardware components in a network.

The BNGs 120 can be connected to the SASE domain 104 using various different techniques including, for example, a direct connection, an SD-WAN network, Generic Routing Encapsulation (GRE) tunnels, and/or IP Security (IPsec)

tunnels. Communication pathways between the BNGs and the SASE gateway are represented as tunnels 134 in FIG. 1.

The enterprise domain 120 includes network infrastructure for particular enterprises, also referred to as tenants. For example, an enterprise or tenant may be an entity such as a corporation that maintains an enterprise network 138 or a data center network (DCN) that includes private corporate information such as, for example, customer information, human resources information, accounting information, supply chain information, DevOps information, etc. As used herein, a tenant may refer to an entity such as a corporation that manages and/or maintains an enterprise network and/or a tenant may refer to the network that is managed/maintained by the tenant. The enterprise domain may be accessible via an SD-WAN 108, including, for example, a tenant-specific SD-WAN.

The SASE domain 104 may also provide direct connectivity to the Internet, sometimes referred to as Direct Internet Access (DIA), which may involve providing access to the Internet without first passing traffic through a private network such as an SD-WAN. Direct access to the Internet can be used to access cloud-based services 112 (e.g., SVS1 and SVS2) such as, for example, video streaming services, communications services, office productivity services, storage services, and/or enterprise services.

As stated above, the ISP uses a process (e.g., PPPoE or DOCSIS) to grant access to the ISP's network and the process implemented by the ISP can be used as a proxy of trust for gaining access to SASE services, which may include accessing network resources that are secured by the SASE domain. FIG. 1B illustrates an example of a process that is used by an ISP to authenticate and/or authorize a device that tries to gain access to the ISP. In particular, FIG. 1B illustrates messages between the CPE 118, an access network 121 (which may include access devices 119, FIG. 1A), the BNG 120, and the AAA server 116. In a first operation 1, the CPE sends a PPPoE Active Discovery Initiation (PADI) message to the BNG. For example, this operation may involve a user accessing the CPE through a client on the UE 124. In a next operation 2, the BNG sends an PPPoE Active Discovery Offer (PADO) message to the CPE. In a next operation 3, the CPE sends a PPPoE Active Discovery Request (PADR) message to the BNG. In a next operation 4, the BNG sends a PADI message to the CPE. In an next operation 5, the CPE sends an Access Request message to the BNG. For example, the Access Request message may include the access ID (which may be manually entered by an account holder that is accessing the CPE through the UE 124 that is connected to the CPE). In an example, the access ID is required to gain access to the ISP, e.g., an access ID that is authenticated and/or authorized by the ISP. In a next operation 6, the BNG sends the Access Request to the AAA server. In a next operation 7, after authenticating and/or authorizing the Access Request (e.g., authorizing the access ID), the AAA server sends an Access Accept message to the BNG. In a next operation 8, the BNG sends the Access Accept message to the CPE. In a next operation 9, the BNG sends an Accounting Start message to the AAA server. Although not shown, at this point, the UE 124 may transmit and/or receive data via the ISP domain 102. In a next operation 10, the CPE sends a PPPoE Active Discovery Terminate (PADT) message to the BNG. In a next operation 11, the BNG sends an Accounting Stop message to the AAA server. In an alternative example, a PPPoE connection is negotiated between the UE 124 and the BNG 120. Using the above described process, access is granted to the ISP based on providing a valid access ID.

Although an example of a PPPoE connection between a CPE 118 and a BNG 120 is described as an authentication and/or authorization mechanism for an ISP, an ISP may use other techniques to authenticate and/or authorize a device that is trying to connect to the ISP. In an example of a cable-based ISP, a connection may be established between a cable modem and CMTS. For example, an authenticated and/or authorized connection may be established between a cable modem and a CMTS according to DOCSIS, which may involve an ISP subscriber imputing their credentials (e.g., access ID) via a cable modem to connected to the CMTS.

A technique for implementing secure connectivity of a client-less device (e.g., a device that does not have a SASE client) via an ISP and a SASE is now described with reference to FIGS. 1A-5. With reference to FIG. 1A, a function of the SASE domain 104 is to map the IP addresses of packet traffic received from devices 124 (e.g., UEs) in the ISP domain 102 to a corresponding tenant 138 in the enterprise domain 106 in a manner that ensures that the devices in the ISP domain are authorized to access a tenant-specific network (e.g., tenant-specific SD-WANs 108). In an example, the access ID based access control of an ISP as described with reference to FIG. 1B is relied upon as a proxy of trust to allow a client-less device to gain access to an enterprise network via an ISP and a SASE.

FIG. 2A is a high-level representation of functionality implemented within a SASE domain to ensure that client-less devices in an ISP domain are authorized to access a tenant-specific network via a SASE domain. In the example, a SASE controller within the SASE domain receives access ID-to-tenant mappings that map access IDs used by the ISP to particular tenants that are supported by the SASE domain. Access ID-to-tenant mappings can be established by an administrator of a tenant via, for example, a portal or Application Programming Interfaces (APIs). In an example, an access ID-to-tenant mapping may map a username that is recognized by an ISP to a particular tenant. For example, an access ID (e.g., username) of a particular employee of a company may be mapped to the company. For example, employee "John Doe" of company "Acme" is assigned and access ID (e.g., username=john.doe) and the access ID (john.doe) is mapped to company Acme. The access ID-to-tenant mappings do not change on a per-session basis and can be deemed to be session independent.

In an example, an access ID refers to information that is used to gain authenticated and/or authorized access to a network that is controlled by an ISP. An access ID may include a credential such as a username that is assigned to a subscriber by an ISP. In other examples, an access ID may include a customer ID or an account ID.

With reference to FIG. 2A, a SASE controller also receives access ID-to-IP address mappings that map access IDs used by the ISP to IP addresses that are assigned on a per-session basis. In an example, an access ID-to-IP address mapping for a particular device is sent by the ISP to the SASE domain only if the device (and optionally the corresponding subscriber) has been authenticated and/or authorized by the ISP. Thereby, the authentication and/or authorization by the ISP can serve as a proxy of trust for the SASE domain. In an example, a CPE that is connected to the ISP through PPPoE is assigned an IP address each time a connection is authenticated and/or authorized by the ISP. The IP address may be assigned to the CPE using a well-known protocol such as Dynamic Host Configuration Protocol (DHCP) or IPv6 StateLess Address Auto Configuration (SLAAC). The access ID-to-IP address mappings may change each time the CPE is authenticated and/or authorized to access the ISP and thus can be deemed to be session dependent.

Still referring to FIG. 2A, the SASE controller generates IP address-to-tenant mappings using the access ID-to-tenant mappings and the access ID-to-IP address mappings. The IP address-to-tenant mappings can be deemed to be dynamic in that the IP address-to-tenant mappings change upon changes to the access ID-to-IP address mappings.

FIG. 2B illustrates the generation of IP address-to-tenant mappings using access ID-to-tenant mappings and access ID-to-IP address mappings. In particular, FIG. 2B depicts a table (top) that represents access ID-to-tenant mappings 202, a table (middle) that represents access ID-to-IP address mappings 204, and a table (bottom) that represents IP address-to-tenant mappings 206. The access ID-to-tenant mappings may be generated at the ISP provisioning system and provided to the SASE controller.

In an example, the access ID-to-IP address mappings 204 are provided to a SASE controller by the ISP domain. In an example, a particular access ID-to-IP address mapping is provided to the SASE controller only after the ISP is able to authenticate and/or authorize a device (e.g., a CPE) that is trying to connect to the BNG of the ISP. For example, the access ID-to-IP address mapping is provided to the SASE controller only after the ISP authenticates and/or authorizes a CPE using an authentication process as described with reference to FIG. 1B. Thus, the authentication and/or authorization process implemented by the ISP to establish a connection between the BNG and the CPE establishes a trusted relationship between the ISP and the device (e.g., the CPE) that is accessing the network of the ISP, e.g., accessing the ISP domain. The trusted relationship between the ISP and the device (e.g., CPE) is then leveraged by the SASE domain to provide SASE services as described herein.

In an example, the IP address-to-tenant mappings (FIG. 2B, 206) are generated at a SASE controller by applying a particular access ID-to-IP address mapping to the access ID-to-tenant mappings (FIG. 2B, 202). For example, the SASE controller matches the device's access ID (e.g., access ID=username) to an access ID in the access ID-to-tenant mappings to identify a tenant and then maps the IP address of the device to the tenant to generate the IP address-to-tenant mapping. In an example, the IP address-to-tenant mapping is used to learn the tenant to which a particular IP packet flow belongs. In an example, based on the source IP address of the IP packet flow, the IP address-to-tenant mappings (e.g., table 206) is used to find the corresponding tenant. SASE services can then be applied to the IP packet flow according to tenant-specific rules. For example, the IP packet flow is allowed access to a particular SD-WAN 108 and/or to a particular enterprise domain 138.

Referring back to FIG. 1A, in an example, the IP address-to-tenant mappings 206 as shown in FIG. 2B are distributed from the SASE controller 130 to the SASE gateway 132, or SASE gateways, in the SASE domain 104. Although the generation of the IP address-to-tenant mappings is described as being a function of the SASE controller, in another example, the IP address-to-tenant mappings may be generated at the SASE gateway, or SASE gateways, using information received from the SASE controller and/or information received directly from the ISP domain 102.

Figure 3A:
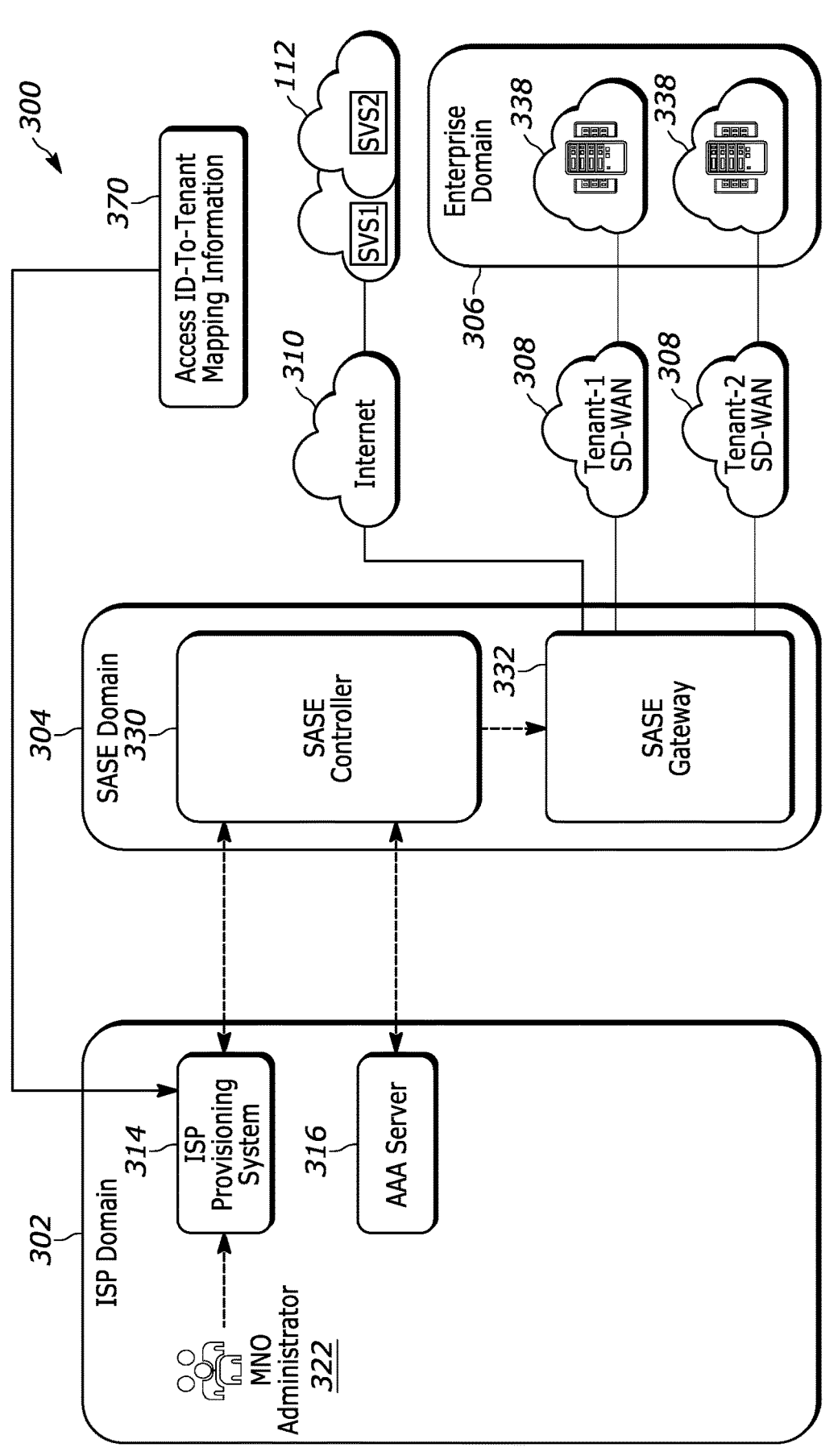
FIG. 3A illustrates an operation in which access ID-to-tenant mapping information is established within the SASE domain.

Various operations of the technique for providing secure connectivity of a client-less device via an ISP and a SASE are now described with reference to FIGS. 3A-3D. With reference to FIG. 3A, in a first operation, access ID-to-tenant mapping information 370 is provided to the ISP domain 302 of the network architecture 300 from, for example, a company, which may be the same as a tenant. For example, a company (e.g., tenant) may communicate information about subscribers to the ISP service provider that are to be included in the SASE service. In one example, a company may sign up for a service from the ISP that includes unique access IDs for ten branch offices and for two executives. Thus, the ISP will provision twelve unique access IDs that are mapped to the company. In another example, access ID-to-tenant information may be provided by a company directly to the SASE controller, which then communicates information about subscribers that are to be included in the SASE service to the ISP domain 302 and the ISP provisions the access IDs that are to be subscribed to the SASE service. The information provided to the ISP domain could include access IDs such as usernames, user information (e.g., name and address of the user), device information (e.g., serial number of the CPE), and/or the location of a device (e.g., the location of the CPE (cable/DSL modem) that is assigned to the access ID). In an example, subscriber information (e.g., access ID) is communicated to the SASE controller in the SASE domain from the provisioning system 314 of the ISP domain and the SASE controller registers a specific access ID, and optionally a particular device (e.g., serial number of the CPE), to a specific tenant in the enterprise domain 306.

Figure 3B:
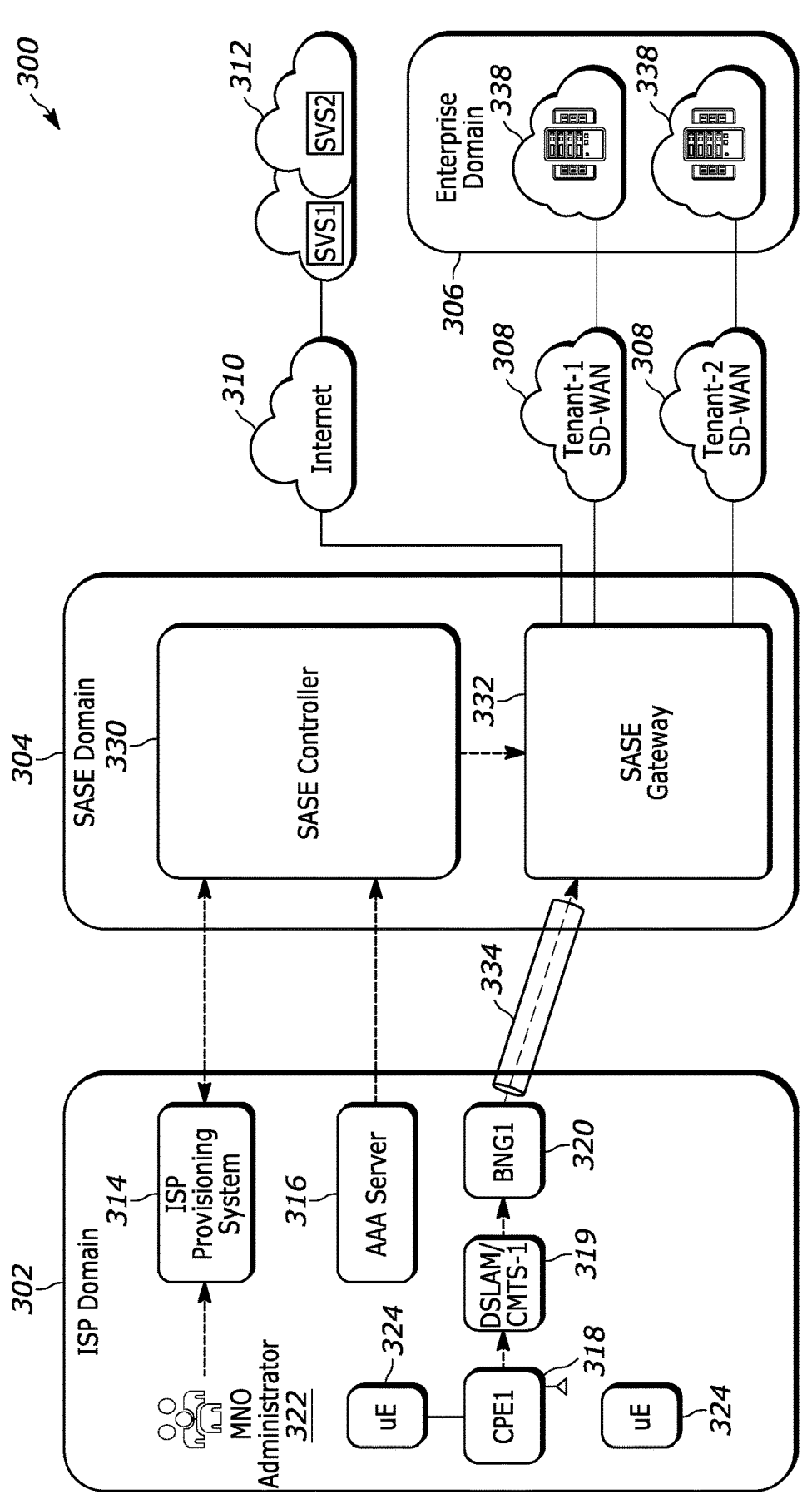
FIG. 3B illustrates an operation in which a device attempts to connect to the network of the ISP via a CPE of the ISP.

With reference to FIG. 3B, in a next operation, a CPE 318 attempts to connect to the network of the ISP. For example, the CPE 318 attempts to connect to the trusted network, in this case the ISP, e.g., via the DSLAM/CMTS 319 and the BNG 320. For example, the CPE 318 initiates a PPPoE connection to the BNG 320 as described above with reference to FIG. 1B. In an example, the connection between the CPE 318 and BNG 320 may be implemented through a UE 324 that is connected to the CPE 318. For example, the UE 324 may be a wired device that is physically connected to the CPE 318 by an Ethernet cable, or the UE 324 may be a wireless device that is wirelessly connected to the CPE 318 by knowing the SSID and the password of the WiFi network. Regardless of whether the UE 324 is connected to the CPE 324 via an Ethernet cable or via the WiFi network, there is some level of trust that the UE is authorized to access the CPE, and thus authorized to access the ISP, based on the fact that the device is physically connected to an Ethernet cable (which is connected to the CPE) or the device had access to the WiFi password/key code of the CPE. Once a PPPoE connection has been established between the CPE 318 and the BNG 320, the BNG 320 allocates an IP address to the CPE and the BNG informs the AAA server 316 of the allocated IP address along with the access ID (e.g., subscriber credentials (username) and/or device information such as modem serial number). Next, the AAA server forwards the allocated IP address and access ID to the SASE controller 330 in the SASE domain 304. Optionally, the BNG can send the IP address and access ID directly to the SASE gateway 332 instead of, or in addition to, sending the information to the SASE controller. The SASE controller (and/or the SASE gateway) can be notified of the IP address and access ID using, for example, Restful API or an AAA Accounting messaging (e.g., a RADIUS Accounting Start message). Next, the SASE controller correlates the IP address and access ID associated with the CPE 318 to a tenant using the access ID-to-tenant mapping as described with reference to FIGS. 2A and 2B to generate an IP address-to-tenant mapping. For example, the SASE controller matches the access ID (e.g., access ID=subscriber username) to an access ID in the access ID-to-tenant mappings to identify a tenant and then maps the IP address of the device (e.g., the source IP address of an IP packet) to the tenant to generate the IP address-to-tenant mapping. Next, the SASE controller distributes the IP address-to-tenant mapping to the SASE gateways in the SASE domain.

Once the CPE 318 is connected to the network of the ISP domain 102, a connected UE 324 can send and receive data via the CPE. For example, a UE 324 can send/receive IP packets to/from the Internet 310 and the enterprise domain 306. Traffic, which is identified at the ISP as traffic that should be handled by the SASE domain, may be passed via a tunnel 334 to the SASE domain. In an example, the SASE gateway can use the IP address-to-tenant mappings to direct traffic received from the BNG to the Internet, to direct traffic received from the BNG to the appropriate tenants in the enterprise domain, and/or to apply appropriate policies to the traffic received from the BNG.

Figure 3C:
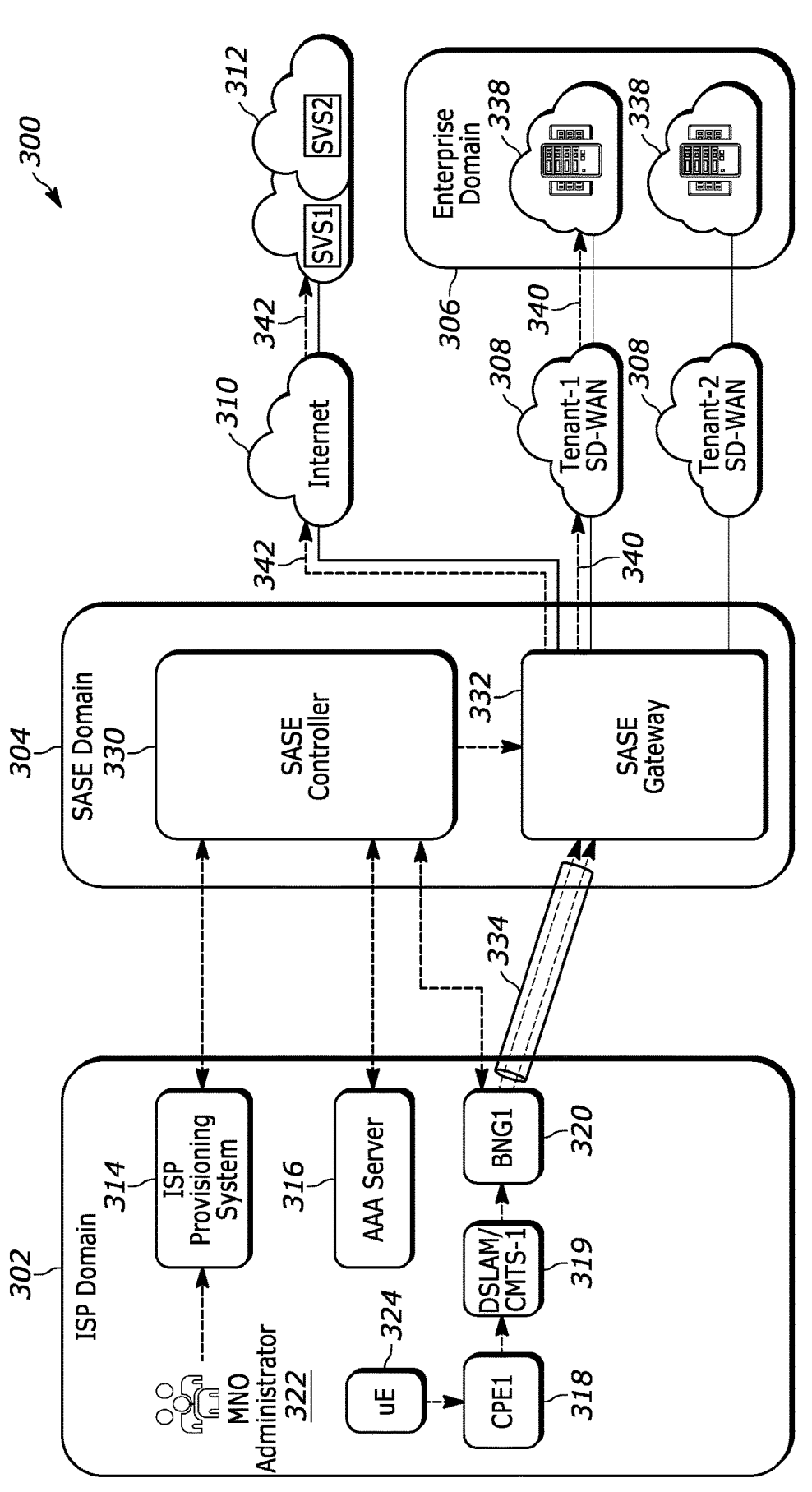
FIG. 3C illustrates traffic being directed from a broadband network gateway to the SASE gateway via a tunnel.
Figure 4A:
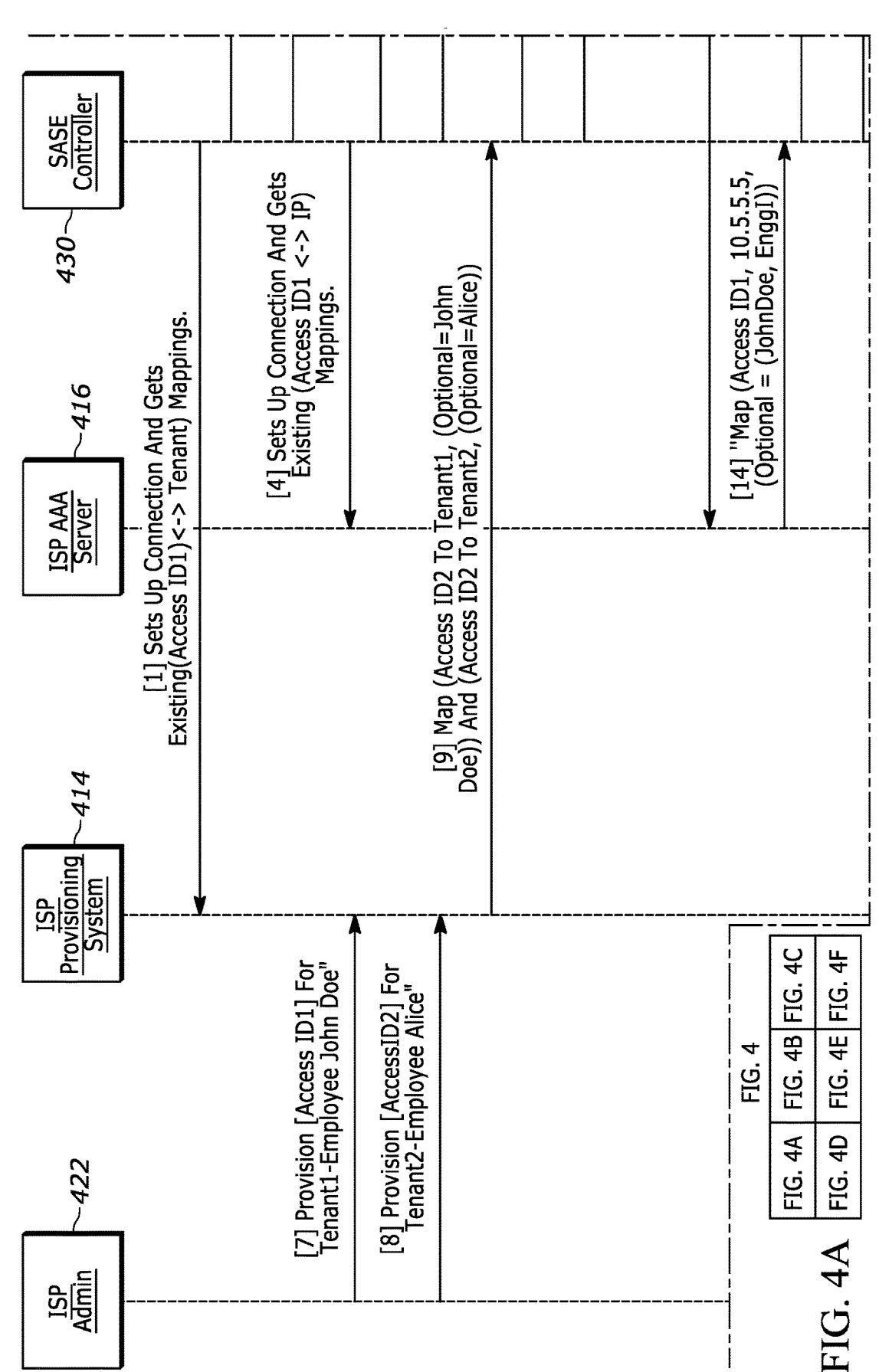
Figure 4C:
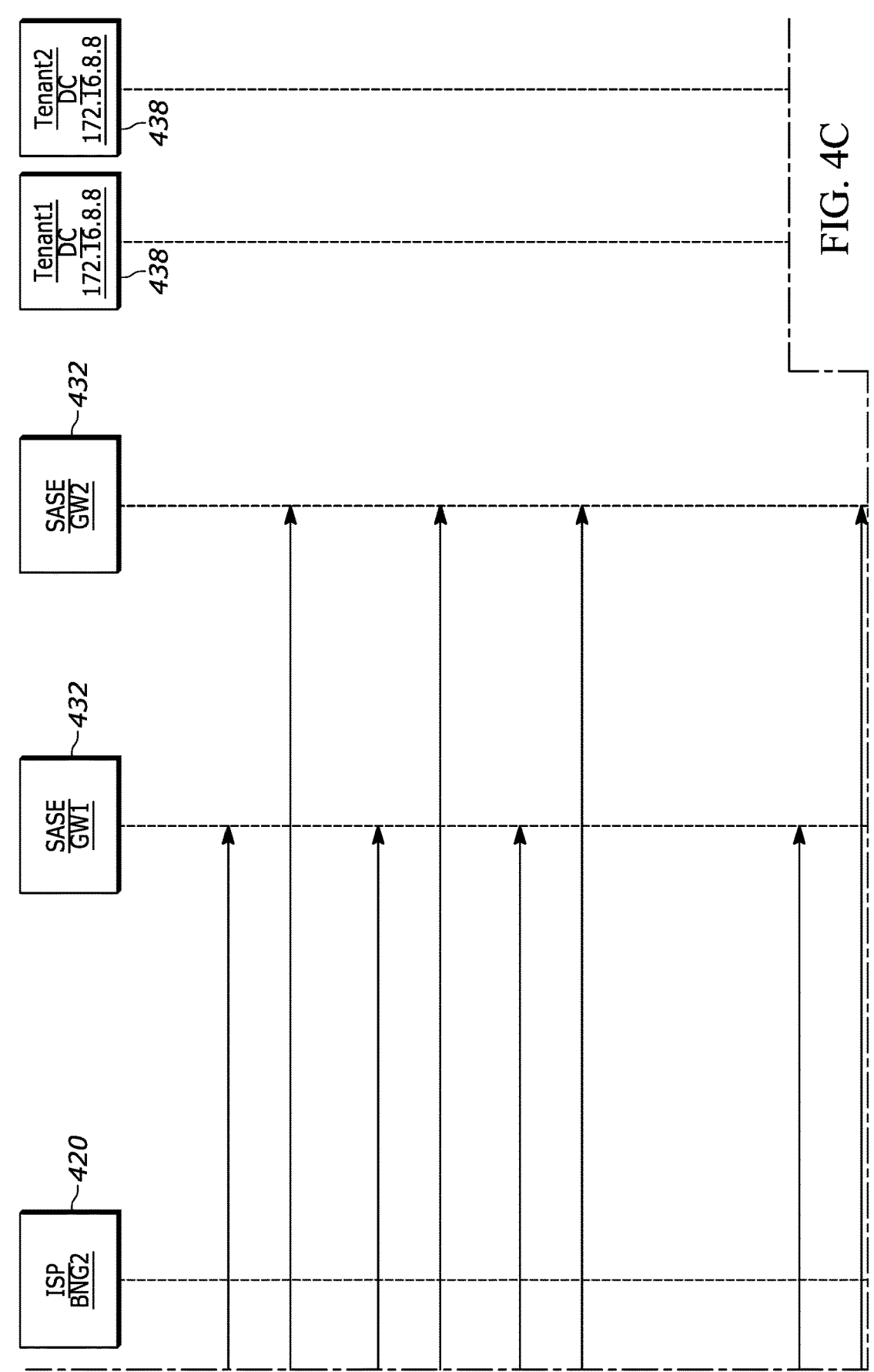
Figure 4D:
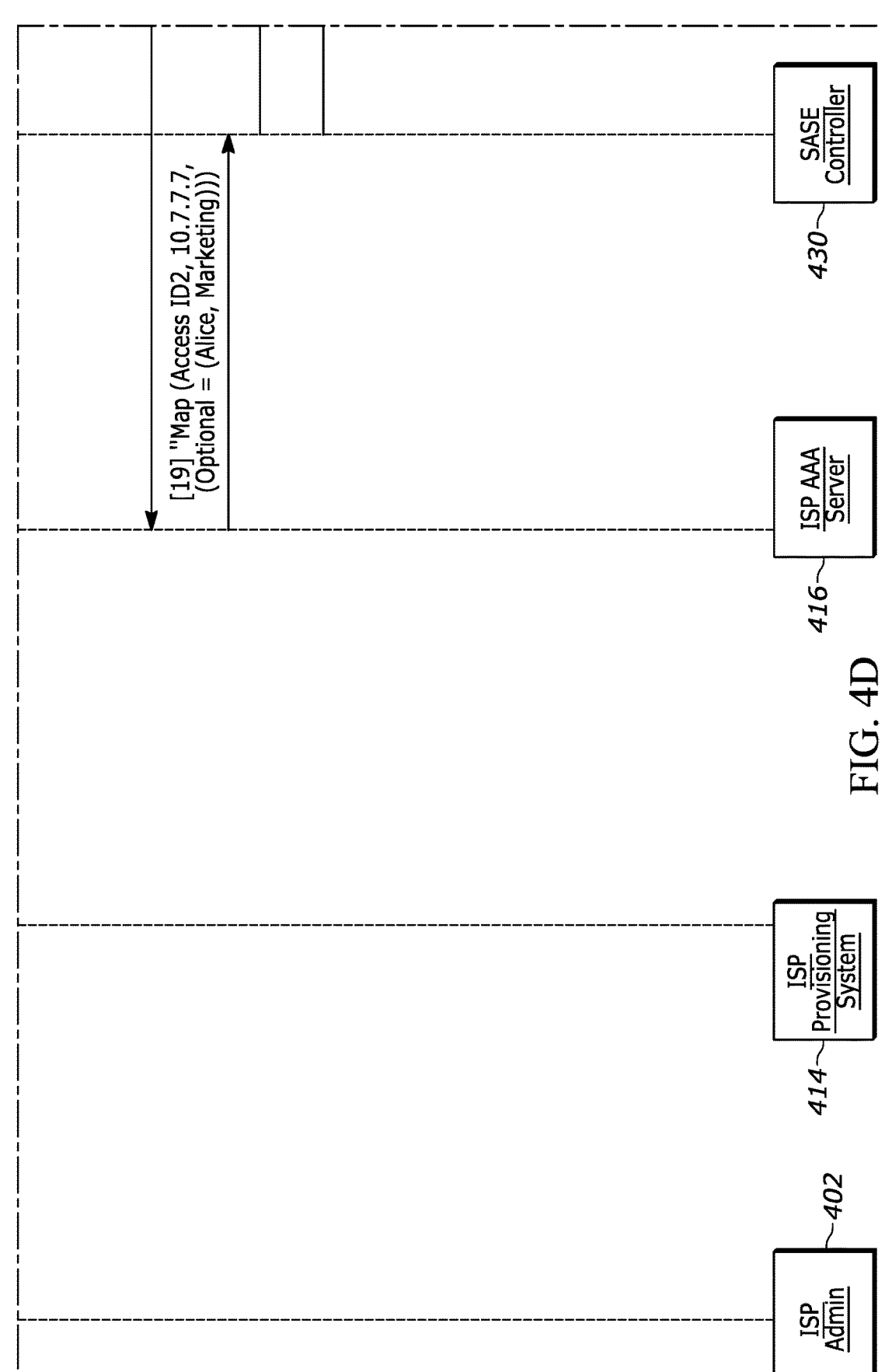
Figure 4E:
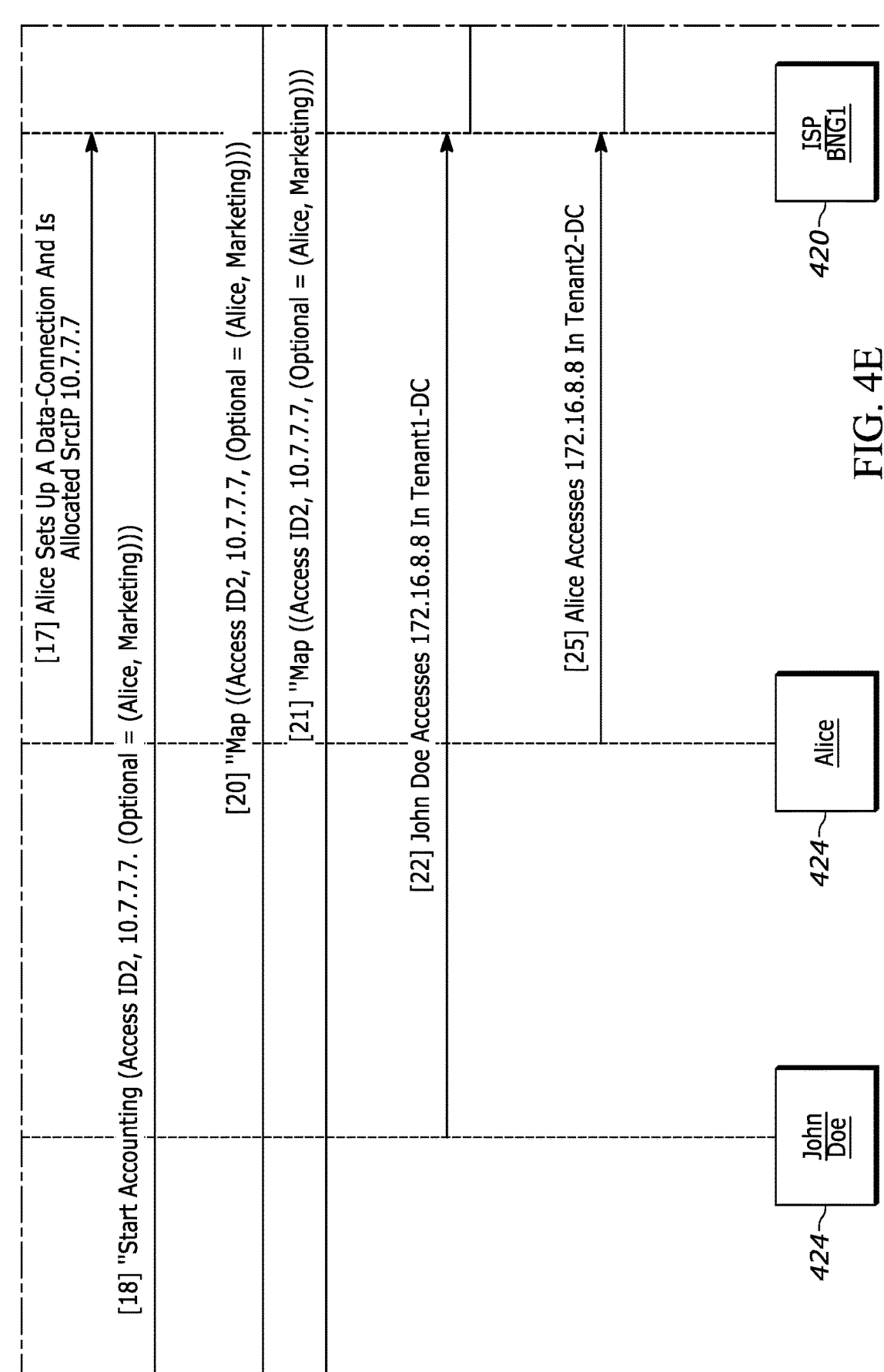
Figure 4F:
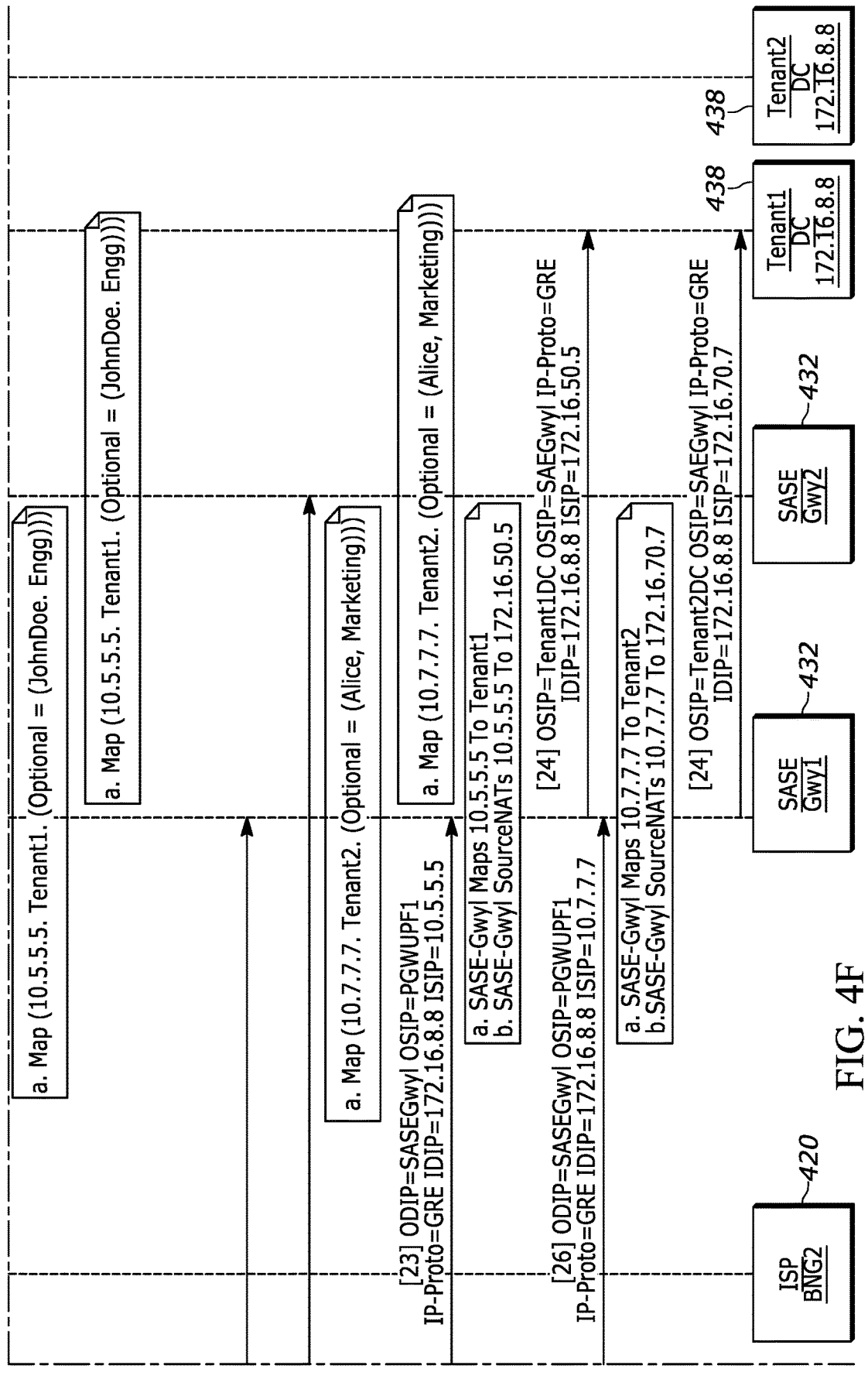

In an example, the BNG 320 sends all traffic associated with the SASE domain 330 to the SASE gateway 332. FIG. 3C illustrates traffic being directed from the BNG 320 to the SASE gateway via a tunnel 334

Upon receiving traffic via the BNG 320, the SASE gateway 332 segregates the traffic to a specific tenant based on the IP address-to-tenant mappings. For example, the SASE gateway 332 uses the destination IP address of a received IP packet to find a corresponding tenant in the IP address-to-tenant mappings (e.g., table 206, FIG. 2B). In an example, traffic 340 that is destined to a tenant in the enterprise domain 306 is sent to the enterprise domain over a secure tunnel (e.g., tenant-specific SD-WAN 308 or IPSec) and traffic 342 that is destined to the Internet is sent as conventional IP traffic. Traffic destined for the Internet could be subjected to a Network Address Translation (NAT) before the packets are sent to the Internet and traffic destined to the enterprise domain could be subjected to a NAT using a pool of IP addresses that are configured for a particular tenant.

In addition to directing traffic to the appropriate tenants, enhanced SASE services can be implemented in the SASE domain 304 by enumerating different groups within a tenant and applying group-specific SASE policies to the groups. FIG. 3D depicts access ID-to-tenant and IP address-to-tenant mappings 302 and 306 that are extended to support tenant-specific groups. As illustrated in FIG. 3D, tenants may have tenant-specific groups (identified by a tenant-specific GroupID) and each tenant-specific group may have a corresponding SASE policy. Thus, a particular tenant can have various different groups and the groups can have corresponding group-specific SASE policies. Group-specific SASE policies may include context driven UE security, access policy, user/group ID, device type, IP address, geolocation, device operating system, operating system security compliance, Quality of Service (QoS) (e.g., gold/silver/bronze service levels), traffic steering, etc.

The tenant-specific group information could be provisioned along with the tenant information during the provisioning process and the SASE gateway enforces the policies based on the groups defined within a particular tenant. In an example, security cameras of a tenant can be grouped in a tenant-specific group (e.g., group=SEC-CAM) and devices in the tenant-specific group could have access to only a video monitoring application and to a specific IP address segment. Any other communication to or from a device in the group could be blocked. For example, with reference to FIG. 3D, the tenant-specific group for Tenant 1 may be Group B and the corresponding policy is Policy=121.

The techniques described above can be deployed across a network architecture that includes multiple ISP gateways, multiple SASE gateways, and multiple tenants-specific DCNs. FIG. 4 is a process flow diagram of a technique for secure connectivity that relies on ISP authentication/authorization as a proxy of trust. In the example of FIG. 4, operations are performed amongst elements in a network architecture similar to the network architecture described above. The elements in the network architecture include (from left to right) an ISP administrator 422 (ISP admin), an ISP provisioning system 414, an ISP AAA server 416, a SASE controller 430, a device 424 the corresponds to subscriber "John Doe," a device 424 that corresponds to subscriber "Alice," a first BNG 420 (ISP BNG1), a second BNG 420 (ISP BNG2), a first SASE gateway 432 (SASE GW1), a second SASE gateway 432 (SASE GW2), a first tenant data center 438 (Tenant1 DC), and a second tenant data center 438 (Tenant2 DC). In the example of FIG. 4, operations amongst the elements of the network are performed in a sequence as indicated by the numbered operations. The sequence of numbered operations are:

(1) Sets up connection and gets existing (access ID<->Tenant) mappings;
(2) Provides existing (access ID<->Tenant) mappings;
(3) Provides existing (access ID<->Tenant) mappings;
(4) Sets up connection and gets existing (access ID<->IP) mappings;
(5) Provides existing (access ID<->IP) mappings;
(6) Provides existing (access ID<->IP) mappings;
(7) Provision access ID1 for Tenant1—e.g., employee "John Doe";
(8) Provision access ID2 for Tenant2—e.g., employee "Alice";
(9) Map ((access ID1 to Tenant1, (Optional=John Doe)) and (access ID2 to Tenant2, (Optional=Alice)));
(10) Map ((access ID1 to Tenant1, (Optional=John Doe)) and (access ID2 to Tenant2, (Optional=Alice)));
(11) Map ((access ID1 to Tenant1, (Optional=John Doe)) and (access ID2 to Tenant2, (Optional=Alice)));
(12) John Doe sets up a data-connection and is allocated SrcIP 10.5.5.5;
(13) Start Accounting (access ID1, 10.5.5.5, (Optional=(JohnDoe, Engg)));
(14) Map (access ID1, 10.5.5.5, (Optional=(JohnDoe, Engg)));
(15) Map (access ID1, 10.5.5.5, (Optional=(JohnDoe, Engg)));
(16) Map (access ID1, 10.5.5.5, (Optional=(JohnDoe, Engg))), at SASE GW1-Map (10.5.5.5, Tenant1, (Optional=(JohnDoe, Engg))) and at SASE GW2-Map (10.5.5.5, Tenant1, (Optional=(JohnDoe, Engg)));
(17) Alice sets up a data-connection and is allocated SrcIP 10.7.7.7;
(18) Start Accounting (access ID2, 10.7.7.7, (Optional=(Alice, Marketing)));
(19) Map (access ID2, 10.7.7.7, (Optional=(Alice, Marketing)));
(20) Map (access ID2, 10.7.7.7, (Optional=(Alice, Marketing)));
(21) Map (access ID2, 10.7.7.7, (Optional=(Alice, Marketing))), at SASE GW1-Map (10.7.7.7, Tenant2, (Optional=(Alice, Marketing))) and at SASE GW2-Map (10.7.7.7, Tenant2, (Optional=(Alice, Marketing)));
(22) John Doe accesses 172.16.8.8 in Tenant1-DC;
(23) ODIP=SASE GW1, OSIP=ISP BNG1, IP-Proto=GRE, IDIP=172.16.8.8,ISIP=10.5.5.5, and SASE GW1 maps 10.5.5.5 to Tenant1, SASE GW1 SourceNATs 10.5.5.5 to 172.16.50.5;
(24) OSIP-Tenant1 DC, OSIP=SASE GW1, IP-Proto=GRE, IDIP=172.16.8.8, ISIP=172.16.50.5;

(25) Alice accesses 172.16.8.8 in Tenant2 DC;
(26) ODIP=SASE GW1, OSIP=ISP BNG1, IP-Proto=GRE, IDIP=172.16.8.8, ISIP=10.7.7.7, and SASE GW1 maps 10.7.7.7 to Tenant2, SASE GW1 SourceNATs 10.7.7.7 to 172.16.70.7;
(27) OSIP=Tenant2 DC, OSIP-SASE GW1, IP-Proto=GRE, IDIP=172.16.8.8, ISIP=172.16.70.7.

In some cases, it is possible that different tenants may use the same IP address within their respective networks such that a duplicate/overlapping IP address may be used within the enterprise domain. In order to ensure that traffic is forwarded to the proper tenants within the enterprise domain, the SASE domain is able to maintain IP address-to-tenant mappings that enable traffic to be forwarded to the appropriate tenant. In an example, each tenant network is a private network domain and a specific IP address schema is valid within that private network domain. Once the traffic crosses into the private network domain, the SASE gateway is configured to apply tenant-specific Network Address Translation (NAT) to translate received IP addresses to tenant-specific IP addresses that comply with the tenant-specific IP address schema, which allows for seamless communication for tenants even when different tenants use overlapping IP addresses.

In another example, differentiated SASE services, or tiers of service, may be delivered by the SASE domain based on a plan (e.g., gold/silver/bronze) chosen by the subscriber. In one example, an ISP may deliver a particular plan to a subscriber by assigning the subscriber to a particular tier, where a "tier" serves a similar purpose as a "tenant" as described above. For example, the ISP domain may utilize different tiers to provide different levels of SASE service, such as tier 1=gold service, tier 2=silver service, and tier 3=bronze service, to its subscribers, where gold service is a high level of SASE service, silver is a medium level of SASE service, and bronze is a low level of SASE service. For example, the levels of service may relate to services provided by the SASE domain related to bandwidth capability (e.g., 1 Mbs/5 Mbs/10 Mbps service), bandwidth usage limits, security services (e.g., CASB, ZTNA, firewalling, NGFW, and FWaaS), differentiated security policies for each security service, control services (e.g., data access controls), and/or other services/features that may be offered by the SASE domain.

Figure 5A:
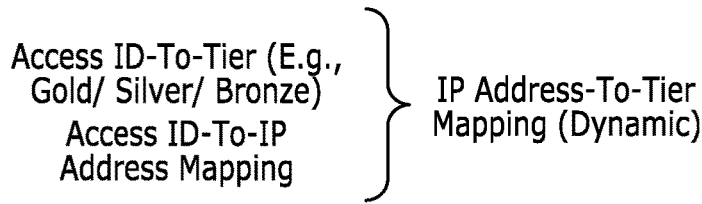
FIG. 5A is a high-level representation of functionality implemented within a SASE domain to ensure that client-less devices in an ISP domain are authorized to access tier-specific network services via a SASE domain.

FIG. 5A is a high-level representation of functionality implemented within a SASE domain to ensure that client-less devices in an ISP domain are authorized to access tier-specific network services via a SASE domain. In the example, a SASE controller within the SASE domain receives access ID-to-tier mappings that map access IDs used by the ISP to particular tiers (e.g., SASE service level tiers) that are supported by the SASE domain. Access ID-to-tier mappings can be established by an administrator of the ISP via, for example, a portal or Application Programming Interfaces (APIs). In an example, an access ID-to-tier mapping may map a username that is recognized by an ISP to a particular tier of service. For example, an access ID (e.g., account ID) of a particular subscriber to the ISP may be mapped to a particular tier. For example, user "John Doe" subscribes to the ISP and is assigned an access ID (e.g., account ID=john.doe) and the access ID (john.doe) is mapped to a particular tier of service. The access ID-to-tier mappings do not change on a per-session basis and can be deemed to be session independent. In an example, an access ID refers to information that is used to gain authenticated and/or authorized access to a network that is controlled by an ISP. An access ID may include a credential such as a username that is assigned to a subscriber by an ISP. In other examples, an access ID may include a customer ID or an account ID.

With reference to FIG. 5A, a SASE controller also receives access ID-to-IP address mappings that map access IDs used by the ISP to IP addresses that are assigned on a per-session basis (e.g., each time a PPPoE connection is established) by the ISP. In an example, an access ID-to-IP address mapping for a particular CPE is sent by the ISP to the SASE domain only if the CPE has been authenticated and/or authorized by the ISP. Thereby, the authentication and/or authorization by the ISP can serve as a proxy of trust for the SASE domain. In an example, a CPE that is connected to the ISP through PPPoE is assigned an IP address each time a connection between the CPE and a BNG is authenticated and/or authorized by the ISP. The IP address may be assigned to the CPE using a well-known protocol such as DHCP or IPv6 SLAAC. The access ID-to-IP address mappings may change each time the CPE is authenticated and/or authorized to access the ISP and thus can be deemed to be session dependent.

Still referring to FIG. 5A, the SASE controller generates IP address-to-tier mappings using the access ID-to-tier mappings and the access ID-to-IP address mappings. The IP address-to-tier mappings can be deemed to be dynamic in that the IP address-to-tier mappings change upon changes to the access ID-to-IP address mappings.

Figure 5B:
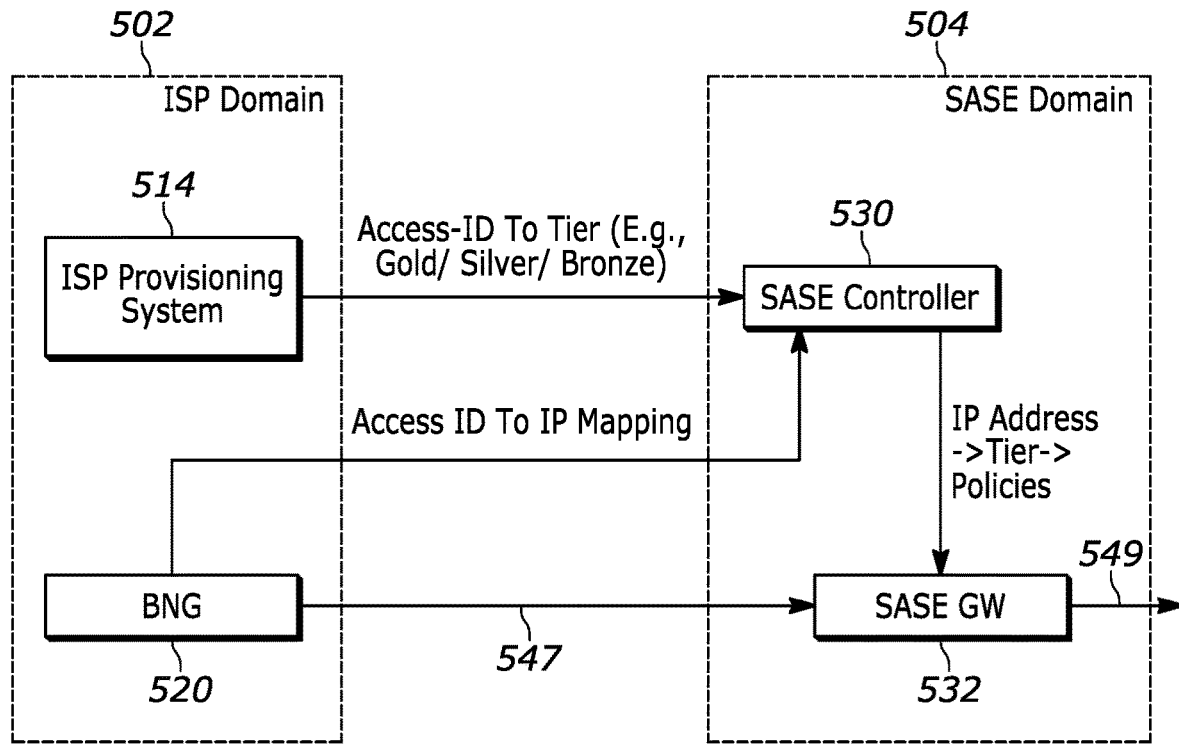
FIG. 5B illustrates operations related to providing secure connectivity to a client-less device with a tier-based solution using the techniques described with reference to FIG. 5A.

FIG. 5B illustrates operations related to providing secure connectivity to a client-less device with a tier-based solution using the techniques described with reference to FIG. 5A. In the example of FIG. 5B, access ID-to-tier mappings are provided to a SASE controller 530 of the SASE domain 504 from an ISP provisioning system 514 of the ISP domain 502. For example, the access ID-to-tier mappings are provided as described above. In addition, access ID-to-IP mappings are provided to the SASE controller 530 from a BNG 520. For example, the access ID-to-IP mappings are provided to the SASE controller from the BNG only after a CPE (not shown) has been authenticated and/or authorized by the BNG as described above. The SASE controller generates the IP address-to-tier mappings from the access ID-to-tier mappings and the access ID-to-IP address mappings similar to that described above with reference to FIGS. 2A and 2B. The SASE controller distributes the IP address-to-tier mappings to the SASE gateway 532 (and likely to other SASE gateways in the SASE domain) for application to received traffic. In an example, the tiers in the IP address-to-tier mappings have corresponding policies that are applied to the traffic that is processed by the SASE gateway. For example, the tiers may correspond to different levels of SASE service, such as tier 1=gold service, tier 2=silver service, and tier 3=bronze service, where gold service is a high level of SASE service, silver is a medium level of SASE service, and bronze is a low level of SASE service, wherein the different levels of service are different from each other. For example, the levels of service may relate to services provided by the SASE domain related to bandwidth capability, bandwidth usage limits, security services (e.g., CASB, ZTNA, firewalling, NGFW, and FWaaS), differentiated security policies for each security service, control services (e.g., data access controls), and/or other services/features that may be offered by the SASE domain.

Upon receiving traffic 547 at the SASE gateway 532 via the BNG 520, the SASE gateway 532 manages the traffic based on the IP address-to-tier mappings. For example, the SASE gateway uses the source IP address of the traffic 547 to find a particular tier of service and then applies policies corresponding to the tier of service to the traffic. For example, the SASE gateway 532 uses the source IP address of a received IP packet from the BNG to find a corresponding tier (e.g., gold/silver/bronze) and applies the polices that correspond to the tier to the traffic. For traffic destined towards the BNG, destination IP address of a received IP packet is used to find a corresponding tier (e.g., gold/silver/bronze) and the BNG applies the polices that correspond to the tier to the traffic. For example, traffic 549 that is output from the SASE gateway 632 has the corresponding policies applied.

In another example, differentiated SASE services, or tiers of service, may be delivered by the SASE domain using pools of IP addresses that are assigned to specific plans (e.g., gold/silver/bronze) that are offered by a SASE domain. In one example, an ISP may deliver a particular plan to a subscriber by assigning the subscriber an IP address from a particular allocated pool of IP addresses. For example, the ISP domain may utilize different pools of IP addresses to support different levels of SASE service, such as tier 1=gold service, tier 2=silver service, and tier 3=bronze service, where gold service is a high level of SASE service, silver is a medium level of SASE service, and bronze is a low level of SASE service. For example, the levels of service may relate to services provided by the SASE domain related to bandwidth capability (e.g., 1 Mbps/5 Mbps/10 Mbps service), bandwidth usage limits, security services (e.g., CASB, ZTNA, firewalling, NGFW, and FWaaS), differentiated security policies for each security service, control services (e.g., data access controls), and/or other services/features that may be offered by the SASE domain. In an example, different pools of IP addresses can be allocated to each different tier of service.

Figures 6A, 6B:
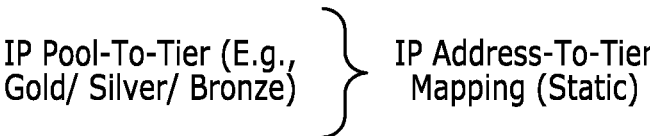
FIG. 6A is a high-level representation of functionality implemented within a SASE domain that uses pools of IP addresses to ensure that client-less devices in an ISP domain are authorized to access tier-specific network services via a SASE domain.
FIG. 6B illustrates the generation of IP address-to-tier mappings using IP address pool-to-tier mappings.

FIG. 6A is a high-level representation of functionality implemented within a SASE domain to ensure that client-less devices in an ISP domain are authorized to access tier-specific network services via a SASE domain. In the example, a SASE controller within the SASE domain receives IP address pool-to-tier mappings that map pools of IP addresses used by the ISP to particular tiers (e.g., SASE service level tiers) that are provided by the SASE domain. IP address pool-to-tier mappings can be established by an administrator of the ISP domain. In an example, an IP address pool-to-tier mapping may map a set (e.g., pool) of IP addresses that is owned by the ISP to a particular tier of service. For example, a first set of IP addresses may be mapped to tier 1, a second set of IP addresses may be mapped to tier 2, and a third set of IP addresses may be mapped to tier 3. In an example, the pools of IP addresses may be identified using "slash" notation. For example, a first pool of IP addresses may be denoted as 192.167.0.0/16, a second pool of IP addresses may be denoted as 192.168.0.0/16, and a third pool of IP addresses may be denoted as 192.169.0.0/16. The IP address pools can also be represented as contiguous sets of IP addresses denoted by a "hyphen". For example, a first pool of IP addresses may be denoted as 192.167.0.0-192.167.1.255, while a second pool of IP addresses may be denoted as 192.167.2.0-192.167.2.255. The IP addresses can also be a list of non-contiguous IP addresses denoted by commas. For example, a first pool of IP addresses may be denoted as 192.167.0.0, 192.167.0.3, 192.167.5.55, etc. In an example, the first, second, and third sets of IP addresses are non-overlapping sets of IP addresses. The IP address pool-to-tier mappings do not change on a per-session basis and can be deemed to be session independent. Still referring to FIG. 6A, in an example, the SASE controller generates IP address-to-tier mappings using the IP address pool-to-tier mappings. For example, each individual IP address in a pool is mapped to the specific tier that corresponds to the pool of IP addresses. The IP address-to-tier mappings can be deemed to be static in that the IP address-to-tier mappings do not change upon changes to access ID-to-IP address mappings. FIG. 6B illustrates the generation of IP address-to-tier mappings using IP address pool-to-tier mappings. In particular, FIG. 6B depicts a table (top) that represents IP address pool-to-tier mappings 602 and a table (bottom) that represents IP address-to-tier mappings 606. The IP address-to-tier mappings may be generated at the SASE domain or at the ISP provisioning system and provided to the SASE domain. In another example, the IP address-to-tier mappings 606 may be provided in a slash format similar to the IP address pool-to-tier mappings 602.

Figure 6C:
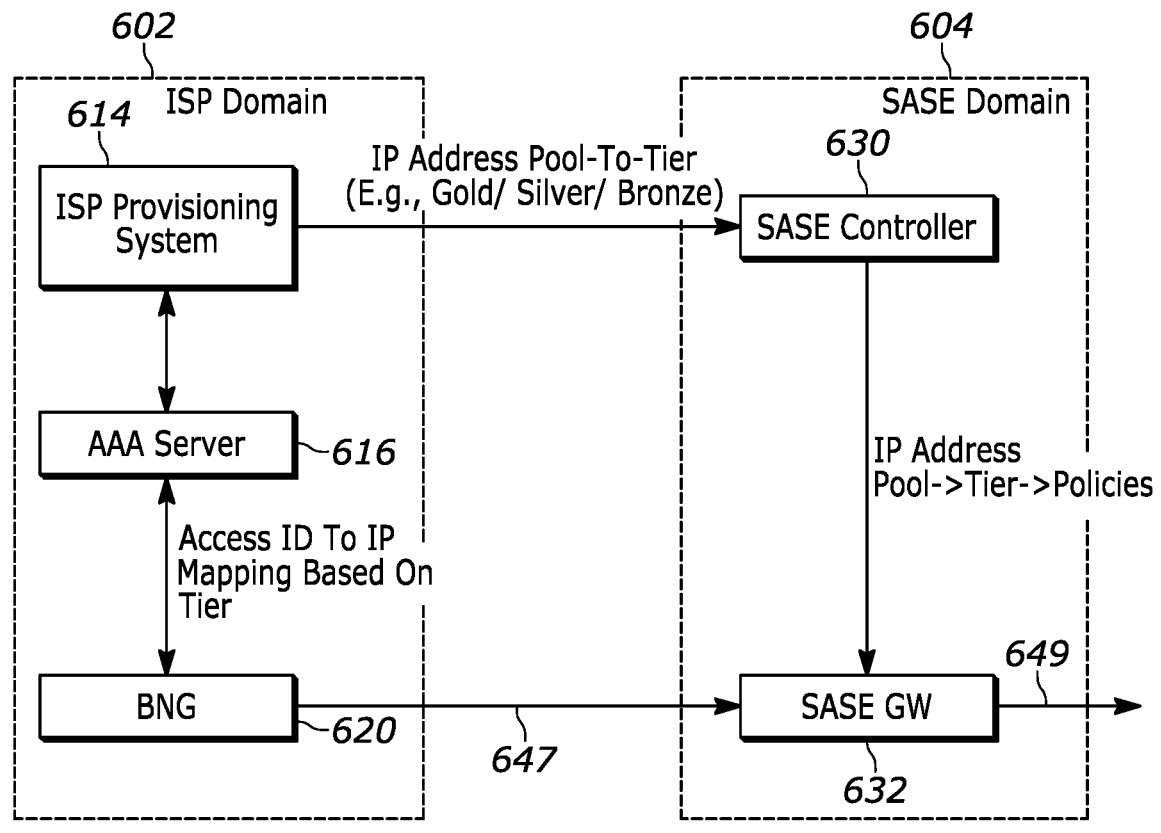
FIG. 6C illustrates operations related to providing secure connectivity to a client-less device with a tier-based solution using the techniques described with reference to FIG. 6A.

FIG. 6C illustrates operations related to providing secure connectivity to a client-less device with a tier-based solution using the techniques described with reference to FIG. 6A. In the example of FIG. 6C, IP address pool-to-tier mappings are provided to a SASE controller 630 in the SASE domain 604 from an ISP provisioning system 614 in the ISP domain 602. For example, the IP address pool-to-tier mappings are provided as described above. In addition, the IP address pool-to-tier mappings are provided to an AAA server 616 from the ISP provisioning system 614. When a CPE (not shown) tries to connect to the BNG 620, the BNG will obtain an IP address for the CPE based on the IP address pool-to-tiers mappings and the access ID of the requestor. In particular, a CPE will be provided an IP address from one of the pools of IP addresses only after the CPE has been authenticated and/or authorized by the BNG as described above. Thereby, the authentication and/or authorization by the ISP can serve as a proxy of trust for the SASE domain. In an example, an IP address will be assigned to the CPE based on the tier of service that is associated with the access ID that is provided in the authentication and/or authorization process. For example, the IP address will be obtained from the first set of IP addresses if the access ID corresponds to tier 1, the IP address will be obtained from the second set of IP addresses if the access ID corresponds to tier 2, and the IP address will be obtained from the third set of IP addresses if the access ID corresponds to tier 3. Once the CPE has established a connection and obtained an IP address, the CPE can send and receive traffic via the BNG 620.

Upon receiving traffic 647 at the SASE gateway 632 via the BNG 620, the SASE gateway 632 manages the traffic based on the IP address-to-tier mappings. For example, the SASE gateway uses the source IP address of the traffic 647 to find a particular tier of service and then applies policies corresponding to the tier of service to the traffic. For example, the SASE gateway 632 uses the source IP address of a received IP packet to find a corresponding tier (e.g., gold/silver/bronze) and applies the polices that correspond to the tier to the traffic. For traffic destined towards the BNG from the SASE gateway, the destination IP address of a received IP packet is used by the SASE gateway to find a corresponding tier (e.g., gold/silver/bronze) and the SASE gateway applies the polices that correspond to the tier to the traffic. For example, traffic 649 that is output from the SASE gateway 632 has the corresponding policies applied. In an example, the levels of service applied to the traffic 649 may relate to tiered services provided by the SASE domain related to bandwidth capability, bandwidth usage limits, security services (e.g., CASB, ZTNA, firewalling, NGFW, and FWaaS), differentiated security policies for each security service, control services (e.g., data access controls), and/or other services/features that may be offered by the SASE domain.

In addition to PPPoE-based authentication/authorization, an ISP may utilize non-PPPoE based authentication and/or authorization to grant access to the ISP domain. For example, a device may connect to an ISP domain through some other authentication and/or authorization techniques such as a certificate installed on the device, a USB-based authentication module (e.g., an RSA module), a YUBIKEY, or a biometric-based (e.g., fingerprint, face recognition, iris scan) authentication.

In an example that utilizes non-PPPoE based authentication/authorization, the AAA server stores information associating the authentication/authorization method into subscriber and customer information. The AAA server distributes the information (e.g., IP address, subscriber information, and device information) to the SASE domain, e.g., SASE controller and/or SASE gateways. When the authenticated/authorized device attempts to communicate outside of the ISP domain, packets are sent to the SASE gateway and the SASE gateway associates the corresponding IP packets to the previously received subscriber information. The forwarding decisions are made by the SASE domain based on the subscriber information. In an example, a subscriber to the ISP is an entity (e.g., a company or an individual) that has established and account with the ISP and has been issued an access ID. In one example, a subscriber correspond to a tenant. For example, company A may be a subscriber to the ISP, and company A may be referred to as "tenant." In an example, a subscriber (or tenant) may have multiple corresponding access IDs. For example, company A may have unique access IDs for multiple different branch offices and additional unique access IDs for some executive level employees. Additionally, the SASE domain may have corresponding subscribers that correspond to the subscribers of the ISP.

It should be noted that the notation "aaa.bbb.ccc.ddd" used in FIGS. 2B, 3D, and 6B to identify IP addresses (e.g., IPv4 IP addresses) may represent unique IP addresses. For example, although each entry in the respective tables is "aaa.bbb.ccc.ddd," the IP addresses are actually different IP addresses.

Figure 7:
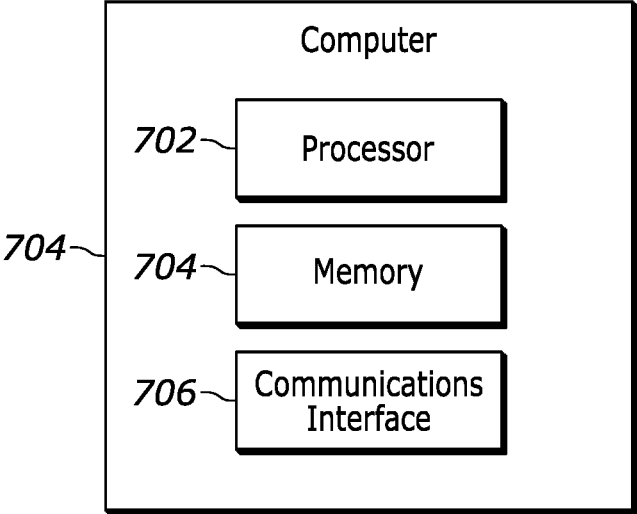
FIG. 7 is a block diagram of a computer that includes a processor, memory, and a communications interface.

In an example, the above-described functionality is performed by a computer or computers (e.g., routers and/or switches) configured to execute computer readable instructions. FIG. 7 is a block diagram of a computer 700 that includes a processor 702, memory 704, and a communications interface 706. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another example, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an example of a non-transitory computer-readable storage medium includes a computer useable storage medium configured to store a computer readable program that, when executed on a computer, causes the computer to perform operations, as described herein.

Furthermore, examples of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be a non-transitory electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various examples are provided. However, some examples may be practiced with less than all of these specific details. In other instances, certain methods, procedures, components, structures, and/or functions are described in no more detail than to enable the various examples of the invention, for the sake of brevity and clarity.

Although specific examples of the invention have been described and illustrated, the invention is not to be limited to the specific forms or arrangements of parts so described and illustrated. The scope of the invention is to be defined by the claims appended hereto and their equivalents.

What is claimed is:

1. A method for providing network connectivity, the method comprising:
   receiving from an Internet Service Provider (ISP) an access ID and an IP address at a Secure Access Service Edge (SASE) domain, wherein the access ID corresponds to a subscriber of the ISP and the IP address is assigned to a customer premise equipment (CPE) that is used by the subscriber to access the ISP, wherein the IP address is assigned to the CPE by the ISP and the access ID and the IP address are received at the SASE domain only after access to the ISP is granted to the CPE by an authentication authorization accounting (AAA) server of the ISP using the access ID that corresponds to the subscriber of the ISP for an authentication process between the CPE and the AAA server of the ISP, wherein access to the ISP that is granted to the CPE by the AAA server of the ISP is used as a proxy of trust by the SASE domain for gaining access to services provided by the SASE domain;

generating an IP address-to-tenant mapping at the SASE domain by applying the access ID and the IP address that were received from the ISP to an access ID-to-tenant mapping; and forwarding traffic received at the SASE domain from a Broadband Network Gateway (BNG) of the ISP according to the IP address-to-tenant mapping.

2. The method of claim 1, wherein the access ID is a username that is assigned to a subscriber by the ISP.

3. The method of claim 1, wherein granting access to the ISP using the access ID involves implementing a Point-to-Point Protocol over Ethernet (PPPOE) connection to the ISP.

4. The method of claim 1, wherein granting access to the ISP using the access ID involves implementing a Data Over Cable Service Interface Specification (DOCSIS) connection to the ISP.

5. The method of claim 1, wherein the access ID is provided to a subscriber by the ISP.

6. The method of claim 1, wherein the access ID is required to gain access to the ISP.

7. The method of claim 1, wherein the traffic received at the SASE domain is generated from a device that is authorized by the ISP using the access ID before the access ID and the IP address are sent to the SASE domain.

8. The method of claim 1, wherein the access ID is provided to a subscriber by the ISP, and wherein the traffic received at the SASE domain is transmitted from a device that is granted access to the ISP using the access ID before the access ID and the IP address is sent to the SASE domain.

9. The method of claim 1, wherein a tenant of the access ID-to-tenant mapping and of the IP address-to-tenant mapping corresponds to company that subscribes to a service provided by the SASE domain.

10. The method of claim 1, wherein a tenant of the access ID-to-tenant mapping and of the IP address-to-tenant mapping corresponds to a tier of service provided by the SASE domain.

11. The method of claim 10, wherein the IP address-to-tenant mapping includes multiple tenants that correspond to multiple tiers of service, and wherein the tiers of service include a first tier of service and a second tier of service, where the first tier of service provides a different level of service than the second tier of service.

12. A non-transitory computer readable medium that stores computer readable instructions, which when executed on one or more processors, implements a method for providing network connectivity, the method comprising:

receiving from an Internet Service Provider (ISP) an access ID and an IP address at a Secure Access Service Edge (SASE) domain, wherein the access ID corresponds to a subscriber of the ISP and the IP address is assigned to a customer premise equipment (CPE) that is used by the subscriber to access the ISP, wherein the IP address is assigned to the CPE by the ISP and the access ID and the IP address are received at the SASE domain only after access to the ISP is granted to the CPE by an authentication authorization accounting (AAA) server of the ISP using the access ID that corresponds to the subscriber of the ISP for an authentication process between the CPE and the AAA server of the ISP, wherein access to the ISP that is granted to the CPE by the AAA server of the ISP is used as a proxy of trust by the SASE domain for gaining access to services provided by the SASE domain;

generating an IP address-to-tenant mapping at the SASE domain by applying the access ID and the IP address that were received from the ISP to an access ID-to-tenant mapping; and forwarding traffic received at the SASE domain from a Broadband Network Gateway (BNG) of the ISP according to the IP address-to-tenant mapping.

13. The non-transitory computer readable medium that stores computer readable instructions of claim 12, wherein granting access to the ISP using the access ID involves implementing a Point-to-Point Protocol over Ethernet (PPPOE) connection to the ISP.

14. The non-transitory computer readable medium that stores computer readable instructions of claim 12, wherein granting access to the ISP using the access ID involves implementing a Data Over Cable Service Interface Specification (DOCSIS) connection to the ISP.

15. The non-transitory computer readable medium that stores computer readable instructions of claim 12, wherein the access ID is required to gain access to the ISP.

16. A method for providing network connectivity, the method comprising:

receiving from an Internet Service Provider (ISP) an access ID and an IP address at a Secure Access Service Edge (SASE) controller, wherein the access ID and the IP address correspond to a subscriber of the ISP and the IP address is assigned to a customer premise equipment (CPE) that is used by the subscriber to access the ISP, wherein the IP address is assigned to the CPE by the ISP and the access ID and the IP address are received at the SASE domain only after access to the ISP is granted to the CPE by an authentication authorization accounting (AAA) server of the ISP using the access ID that corresponds to the subscriber of the ISP for an authentication process between the CPE and the AAA server of the ISP, wherein access to the ISP that is granted to the CPE by the AAA server of the ISP is used as a proxy of trust by the SASE domain for gaining access to services provided by the SASE domain;

generating an IP address-to-tenant mapping at the SASE controller by applying the access ID and the IP address that were received from the ISP to an access ID-to-tenant mapping;

distributing the IP address-to-tenant mapping from the SASE controller to a SASE gateway; and forwarding traffic received at the SASE gateway from a device via the ISP according to the IP address-to-tenant mapping.

17. The method of claim 16, wherein granting access to the ISP using the access ID involves implementing a Point-to-Point Protocol over Ethernet (PPPOE) connection to the ISP.

18. The method of claim 16, wherein granting access to the ISP using the access ID involves implementing a Data Over Cable Service Interface Specification (DOCSIS) connection to the ISP.

* * * * *